United States Patent
Borochov et al.

(10) Patent No.: US 6,988,741 B2
(45) Date of Patent: Jan. 24, 2006

(54) TRICYCLE

(76) Inventors: Peter Borochov, 349 Crown St., Brooklyn, NY (US) 11225; Bernardo Y. Beresnitzky, 349 Crown St., Brooklyn, NY (US) 11225

(*) Notice: Subject to any disclaimer, the term of this patent is extended or adjusted under 35 U.S.C. 154(b) by 0 days.

(21) Appl. No.: 10/698,764

(22) Filed: Oct. 30, 2003

(65) Prior Publication Data

US 2004/0090039 A1    May 13, 2004

Related U.S. Application Data

(63) Continuation-in-part of application No. 10/226,264, filed on Aug. 23, 2002, now abandoned, which is a continuation-in-part of application No. 10/171,436, filed on Jun. 13, 2002, now Pat. No. 6,659,488.

(51) Int. Cl.
*B62M 1/02*    (2006.01)
(52) U.S. Cl. ................ 280/282; 280/261; 280/287
(58) Field of Classification Search .............. 280/282, 280/266, 259, 260, 261, 30
See application file for complete search history.

(56) References Cited

U.S. PATENT DOCUMENTS

| | | | | |
|---|---|---|---|---|
| 3,485,509 A | * | 12/1969 | Searle | ................ 280/243 |
| 4,548,421 A | * | 10/1985 | Wiener | ................ 280/282 |
| 4,789,173 A | * | 12/1988 | Lofgren et al. | ........ 280/288.1 |
| 4,799,704 A | * | 1/1989 | Colarusso | ............. 280/267 |
| 5,383,675 A | * | 1/1995 | Liebert | ................ 280/266 |
| 5,941,548 A | * | 8/1999 | Owsen | ................ 280/282 |
| 6,036,210 A | * | 3/2000 | Lee | ................... 280/250 |
| 2001/0035626 A1 | * | 11/2001 | Kettler | ................ 280/282 |

* cited by examiner

*Primary Examiner*—Kevin Hurley
(74) *Attorney, Agent, or Firm*—Bernard Malina; Malina & Associates, P.C.

(57) ABSTRACT

The present invention 10 discloses a new and novel tricycle with adjustable linkage 48, 54 for varying the drive power for either foot or hand power. Furthermore, the linkage 44, 52 can also be used to vary the wheelbase. Moving the front wheel 14 toward the rear wheels 22 provides for a tighter turning radius. Moving the front wheel 14 away from the rear wheels 22 provides for greater stability at high speed. In addition, the linkage 48, 54 provides for the selective placement along a horizontal and/or vertical plane relative to the seat 24 allowing persons of varying size to comfortably position the pedal assembly 16. Additionally, the present invention 10 has a cantilevered seat frame 30 with the seat 24 at one distal end and the other end forming a yoke 32 connected to the front wheel steering pivot column 34 whereby left movement of the seat 24 results in a right turn of the front wheel 14 and a right movement of the seat 24 results in a left turn of the front wheel 14.

10 Claims, 39 Drawing Sheets

TRICYCLE

The present application is a Continuation-in-Part of our application titled "Tricycle", Ser. No. 10/226,264, filed Aug. 23, 2002, now abandoned which is a Continuation-in-Part of Ser. No. 10/171,436, filed Jun. 13, 2002 now U.S. Pat No. 6,659,488.

BACKGROUND OF THE INVENTION

1. Field of the Invention

The present invention relates generally to human powered vehicles and, more specifically, to a new and novel tricycle with an adjustable linkage for varying the drive power for either foot or hand power. Furthermore, the linkage can also be used to vary the wheelbase. Moving the front wheel toward the rear wheels provides for a tighter turning radius. Moving the front wheel away from the rear axle provides for greater stability at high speed. In addition, the linkage provides for the selective placement along a horizontal and/or vertical plane relative the seat allowing persons of varying size to comfortably position the drive mechanism.

Additionally, the present invention has a cantilevered seat with the seat at one distal end and the other forming a yoke connected to the front wheel steering column whereby left movement of the seat results in a right turn of the front wheel and a right movement of the seat results in a left turn of the front wheel.

2. Description of the Prior Art

The prior art related to human powered vehicles includes numerous examples of various types of wheeled vehicles. However, despite the developments of the prior art, while these devices may be suitable for the purposes for which they were designed, they do not provide the range of functional capabilities provided by the present invention.

SUMMARY OF THE PRESENT INVENTION

The present invention discloses a new and novel tricycle with adjustable linkage for varying the drive power for either foot or hand power. Furthermore, the linkage can also be used to vary the wheelbase. Moving the front wheel toward the rear wheels provides for a tighter turning radius. Moving the front wheel away from the rear axle provides for greater stability at high speed. In addition, the linkage provides for the selective placement along a horizontal and/or vertical plane relative to the seat allowing persons of varying size to comfortably position the drive mechanism. Additionally, the present invention has a cantilevered seat with the seat at one distal end and the other end forming a yoke connected to the front wheel steering pivot column whereby left movement of the seat results in a right turn of the front wheel and a right movement of the seat results in a left turn of the front wheel.

A primary object of the present invention is to provide a human powered vehicle having linkage means for varying the position of the guide wheel and drive mechanism.

Another object of the present invention is to provide a human powered vehicle having means for adjusting the backrest of the seat in a vertical movement.

Yet another object of the present invention is to provide a human powered vehicle having means for adjusting the inclination of the backrest of the seat.

Still yet another object of the present invention is to provide a human powered vehicle where the drive mechanism can be positioned whereby the rider can use their hands to power the vehicle.

Another object of the present invention is to provide a human powered vehicle where the guide wheel can be moved closer to or further from the rear axle.

Another object of the present invention is to provide a human powered vehicle having a cantilevered seat forming a yoke for the drive column at one distal end.

Another object of the present invention is to provide a human powered vehicle where the rider can steer the guide wheel by means of the seat by shifting their weight left and right.

Another object of the present invention is to provide a human powered vehicle in which the camber angle of selected wheels can be easily adjusted.

Yet another object of the present invention is to provide a human powered vehicle which can be easily folded into a compact configuration for storage.

Additional objects of the present invention will appear as the description proceeds.

The present invention overcomes the shortcomings of the prior art by providing a tricycle with an adjustable linkage for varying the drive power for either foot or hand power. Furthermore the linkage can also be used to vary the wheelbase. Moving the front wheel toward the rear wheels provides for a tighter turning radius. Moving the front wheel away from the rear axle provides for greater stability at high speed. In addition, the linkage provides for the selective placement along a horizontal and/or vertical plane relative the seat allowing persons of varying size to comfortably position the drive mechanism.

A cantilevered seat with the seat at one distal end and the other forming a yoke connected to the front wheel steering column allows the rider to steer the vehicle by moving the seat literally.

Additionally, adjustment members are provided which facilitate adjustment of the camber angle of the rear wheels. This adjustment enables a rider to adjust the riding characteristics of the apparatus to suit varying conditions of terrain and operating speed.

The various linkages, joints and members of the apparatus facilitate folding the apparatus into an extremely compact configuration for the purposes of storage and transportation of the apparatus in the trunk of an automobile.

The foregoing and other objects and advantages will appear from the description to follow. In the description, reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For a definition of the complete scope of the invention, the reader is directed to the appended claims.

Figure 1:
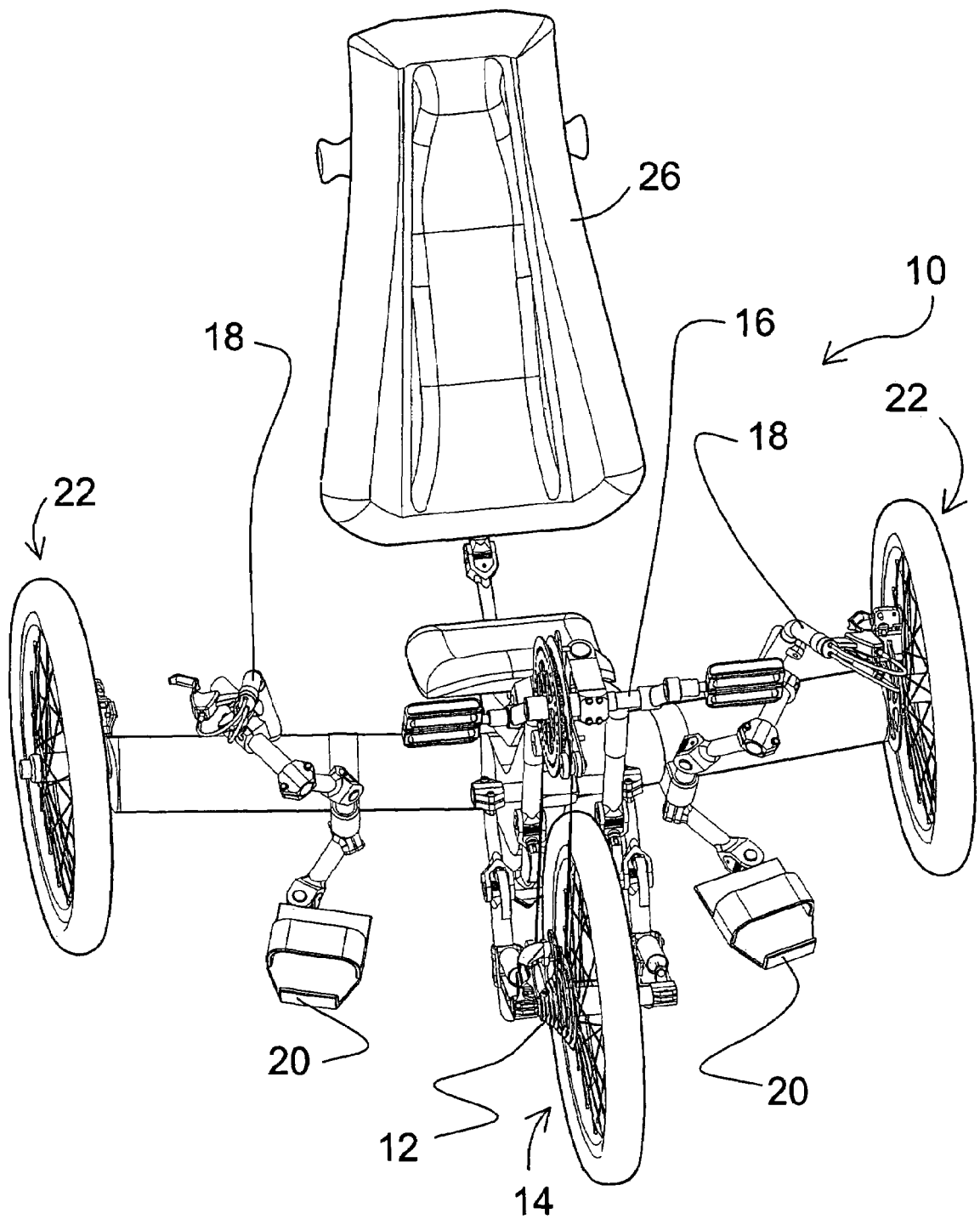
FIG. 1 is a perspective view of a tricycle made according to the present invention.

Turning to FIG. 1, shown therein is a perspective view of the tricycle of the present invention 10. Shown is the present invention 10 with the derailleur line and the brake lines removed for a clearer view. The sprockets 12 and the derailleur are installed in the front wheel 14. The pedal assembly 16 is positioned over the front wheel 14 to drive it. The front wheel 14 and the pedal assembly 16 can be repositioned using various joints. Also shown are the handle assembly 18 and a pair of foot rests 20, a pair of rear wheels 22, a bottom seat 24 and a back seat 26.

Figure 2:
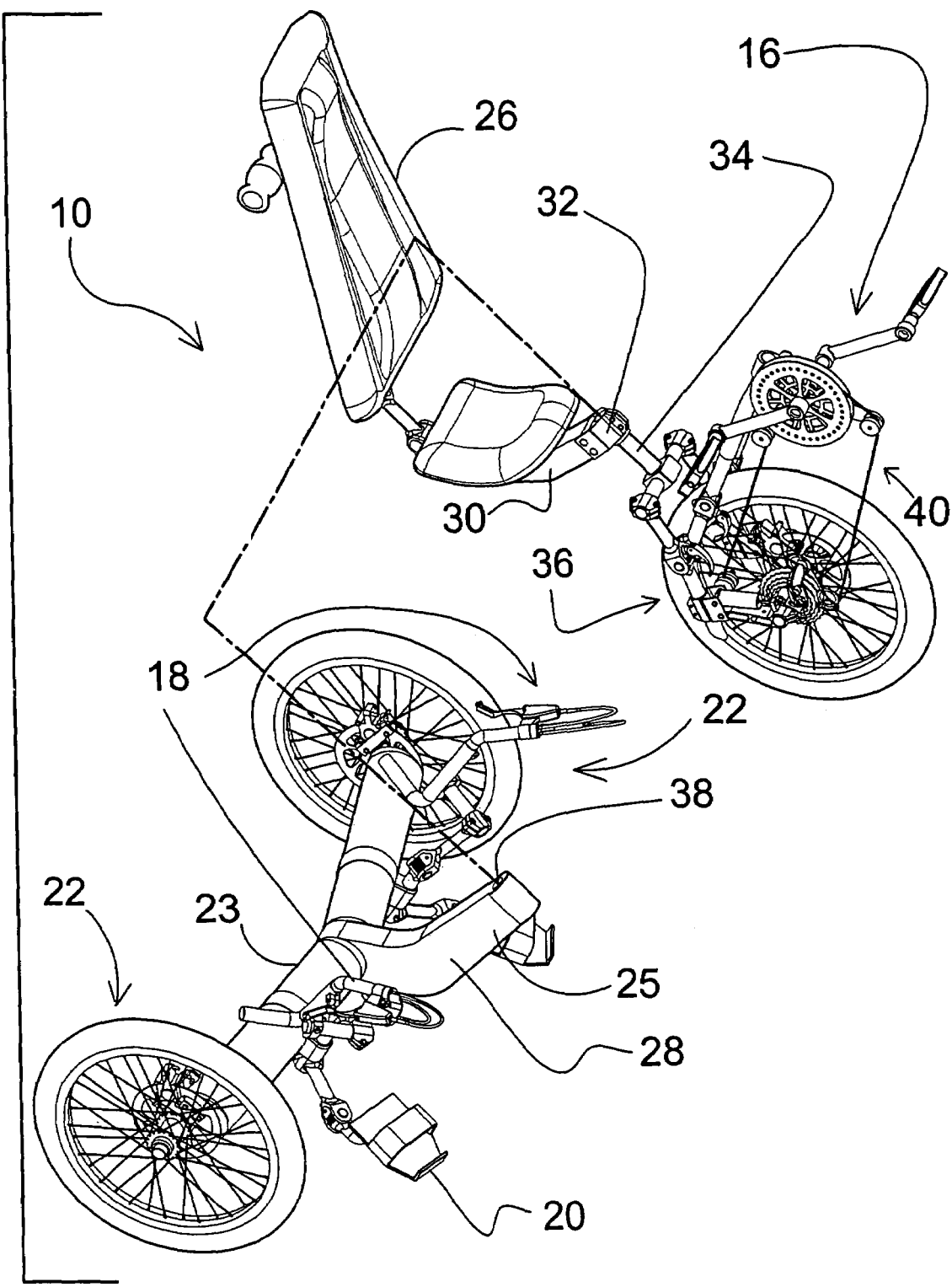
FIG. 2 is an exploded view of the two main parts of the tricycle.

Turning to FIG. 2, shown therein is an exploded view of the two main parts, the rear main frame 28 and front wheel assembly 36, of the tricycle of the present invention 10. The main frame 28 of the tricycle 10 holds the two rear wheels 22 on the ends of axle 23 and has a tongue-like member 25 thereon. The seat frame 30 holds the seats 24, 26 and is pivotably at 69 attached to the seat frame clamp 32, which is rigidly fixed to the steering pivot column 34 and the front wheel assembly 36. These two components, the rear main frame 28 and the front wheel assembly 36, are pivotably engaged to form the tricycle. Also shown are the pedal assembly 16, handle assembly 18, foot rest 20, steering pivot slot 38, and drive chain 40.

Figure 3:
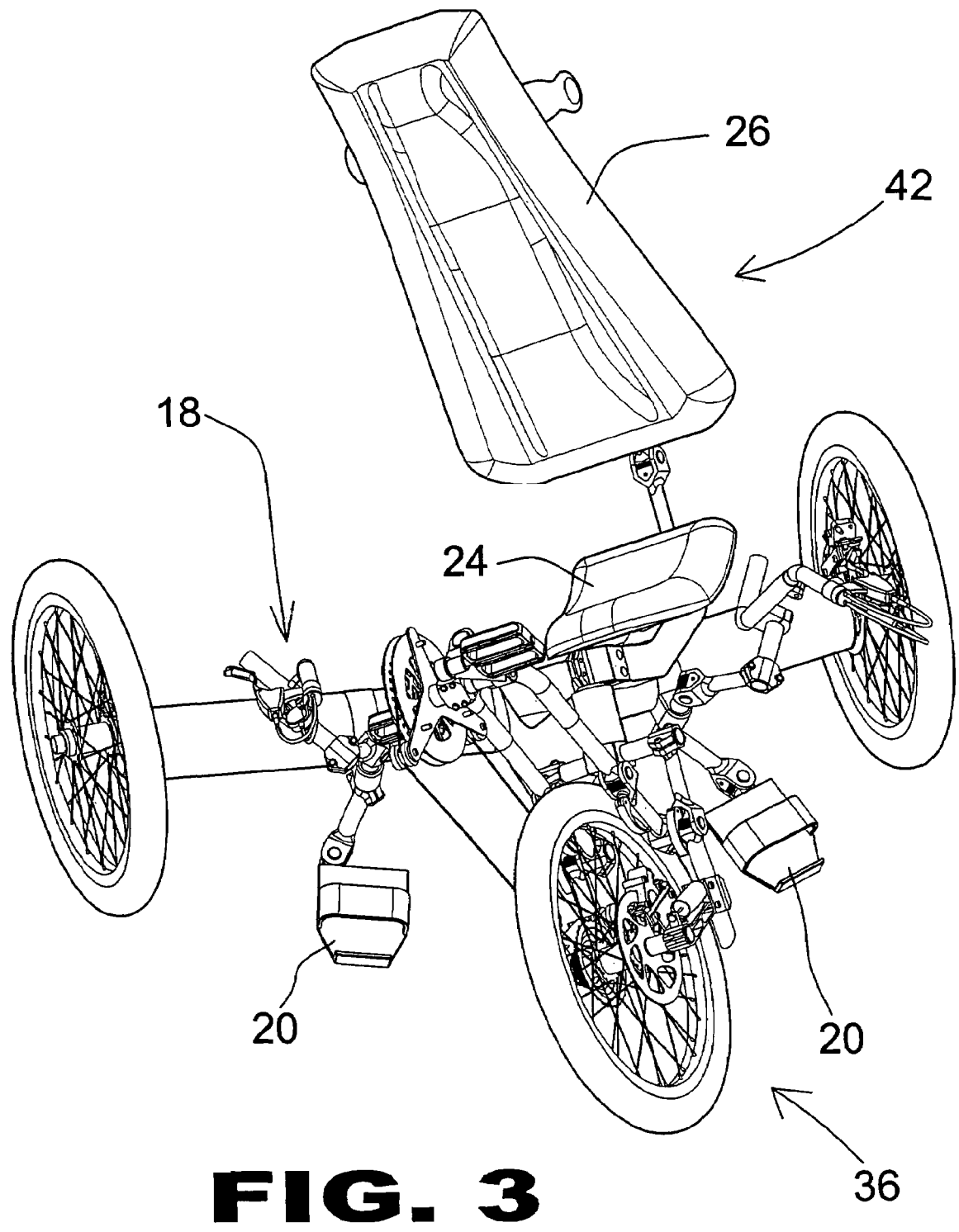
FIG. 3 is a perspective view of the steering operation of the tricycle.

Turning to FIG. 3, shown therein is a perspective view of the steering operation of the tricycle of the present invention 10. Steering is accomplished by a user applying torque to the front wheel assembly 36 and seat assembly 42 with bottom seat 24 and back seat 26 by pushing the handles of handle assembly 18 with the hands while pedaling with the feet. Alternatively, the steering torque can also be applied by pushing the foot rests 20 with feet while pedaling with the hands. In FIG. 3, the tricycle is turning to the left.

Figure 4:
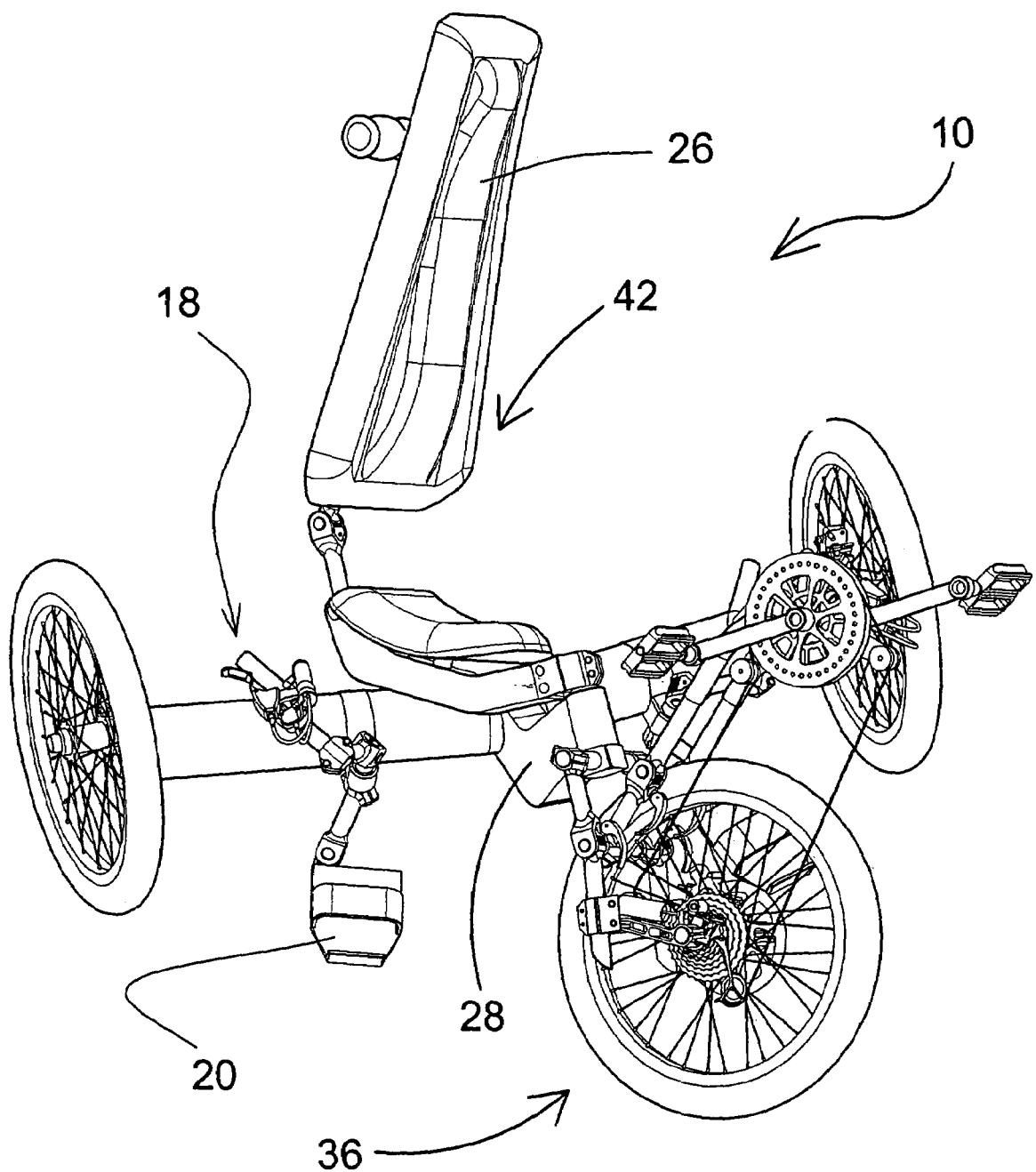
FIG. 4 is another perspective view of the steering operation of the tricycle.

Turning to FIG. 4, shown therein is a perspective view of the tricycle of the present invention with the tricycle turning to the right. Fixed to the main frame 28 are the handle assemblies 18 and the foot rests 20 which provide the leverage needed to apply the steering torque to the front wheel assembly 36 and seat frame assembly 42 with bottom seat 24 and back seat 26 attached thereto.

Figure 5:
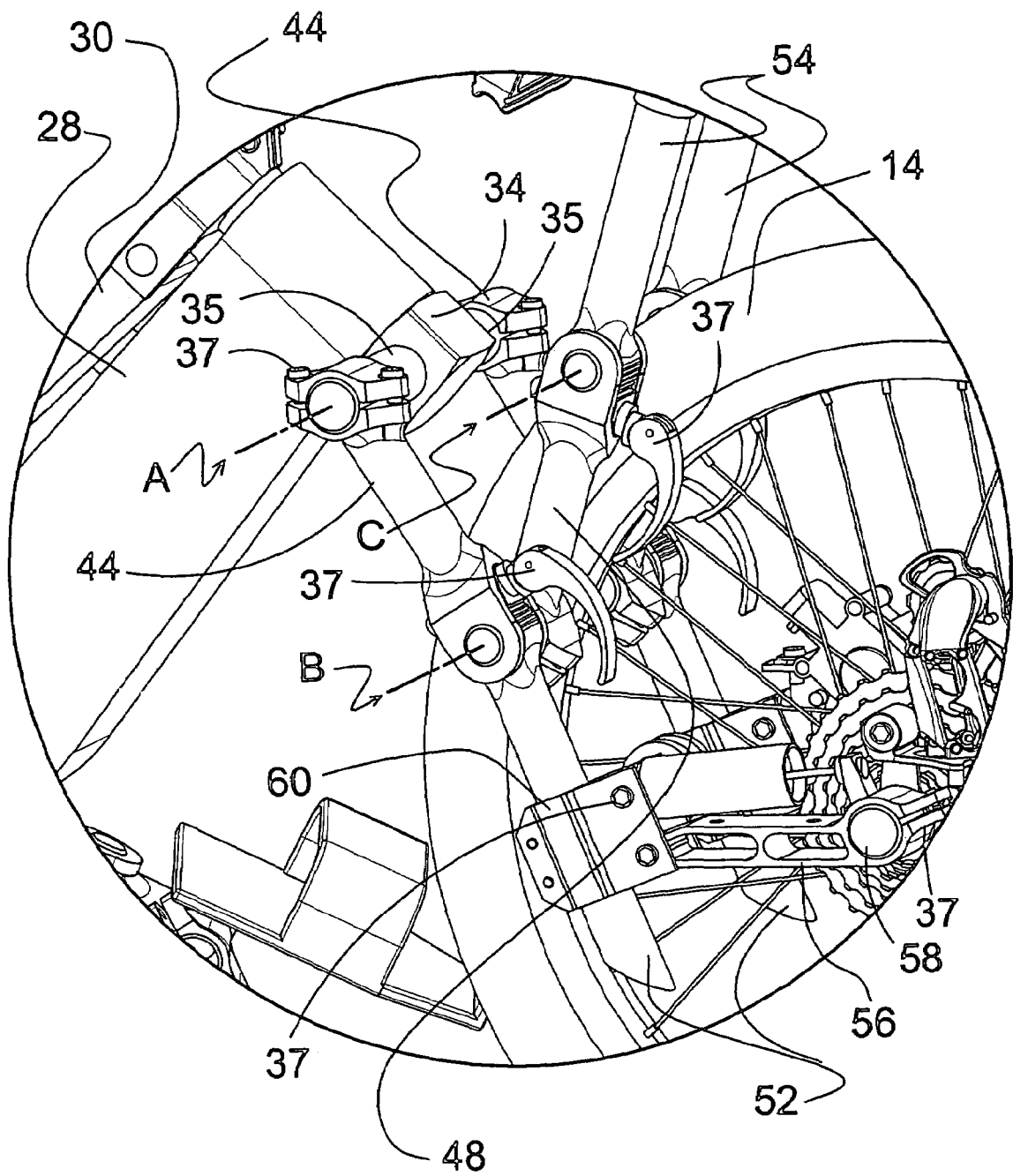
FIG. 5 is a close-up view of the joints around the front wheel.

Turning to FIG. 5, shown therein is a close-up view of the joints associated with the front wheel 14. Extending downward from the two radially extended opposed arms 35 on the lower end of the steering pivot column 34 are two, a right and a left, symmetrical primary extension clamps 44, pivoting around the axis A. Joined to these are the pedal extension clamps 48 (only right side shown) and the front wheel columns 52, pivoting around the axis B. The pedal columns 54 are attached to the pedal extension clamps 48, pivoting around the axis C. The front wheel 14 is attached to the front wheel arm 56 by the front wheel axle 58. The front wheel arm 56 is attached to the front wheel arm clamp 60, which is slidably clamped to the front wheel columns 52. The entire front wheel assembly and pedal assembly, therefore, pivot around the axis A. The front wheel 14 can also pivot around the axis B independently as well as slide along the front wheel columns 52. The pedal assembly (not shown) can pivot around the axes B and C without affecting the front wheel 14. Also shown are the main frame 28 rotatably disposed on the steering pivot column 34 and seat frame 30. The pivot joints A, B and C are fixedly pivotable having means for being fixed such as fastening, clamping or locking means 37 as shown.

Figure 6:
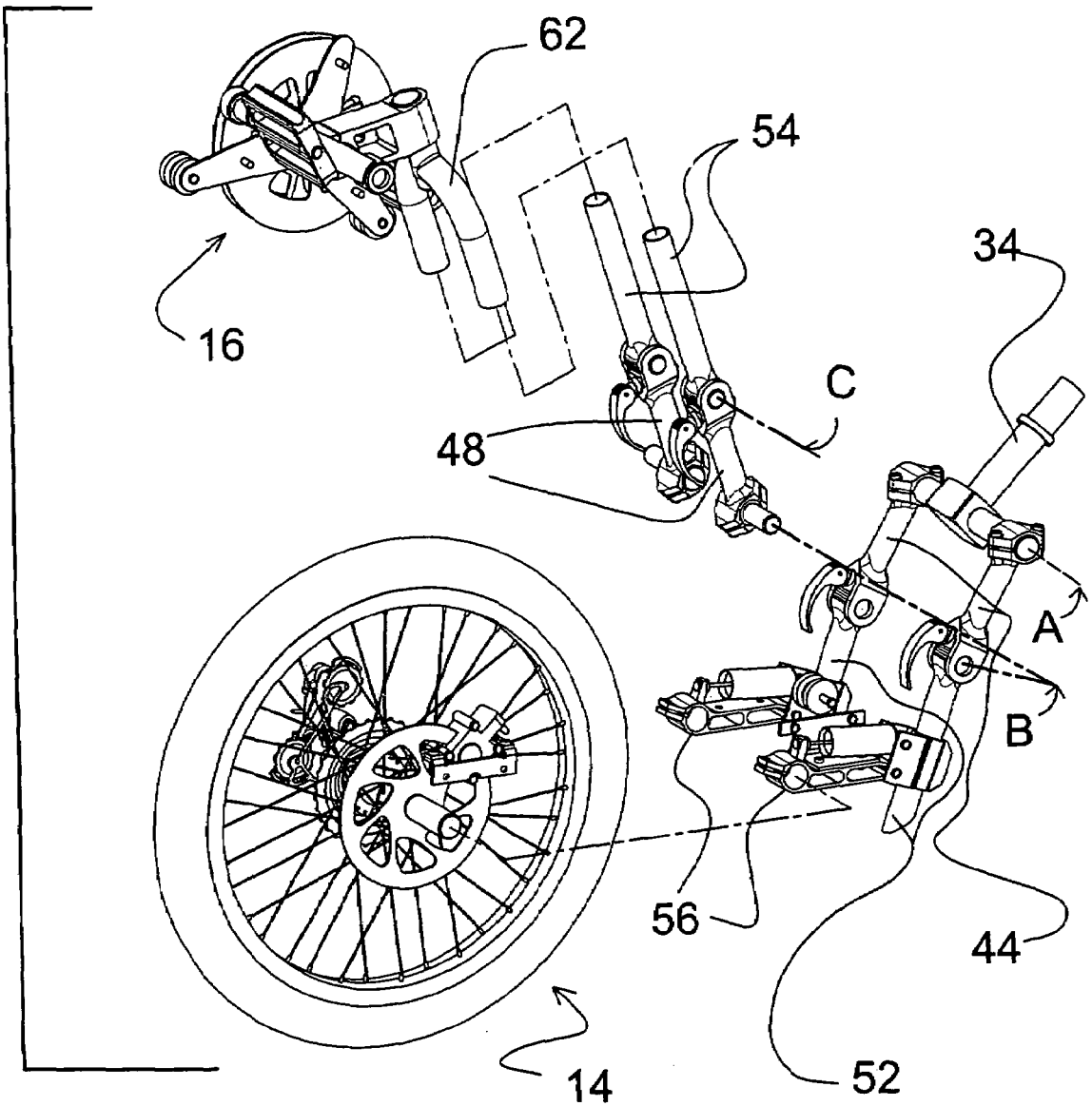
FIG. 6 is an exploded view of the front joints.

Turning to FIG. 6, shown therein is an exploded view of the front joints as previously disclosed. The front joints in FIG. 5 are exploded and shown from the left side (of a rider). All of the extension clamps, columns and arms are positioned and moved and operated symmetrically on both the left and right sides. Also shown is the pedal U-fork 62.

Figure 7:
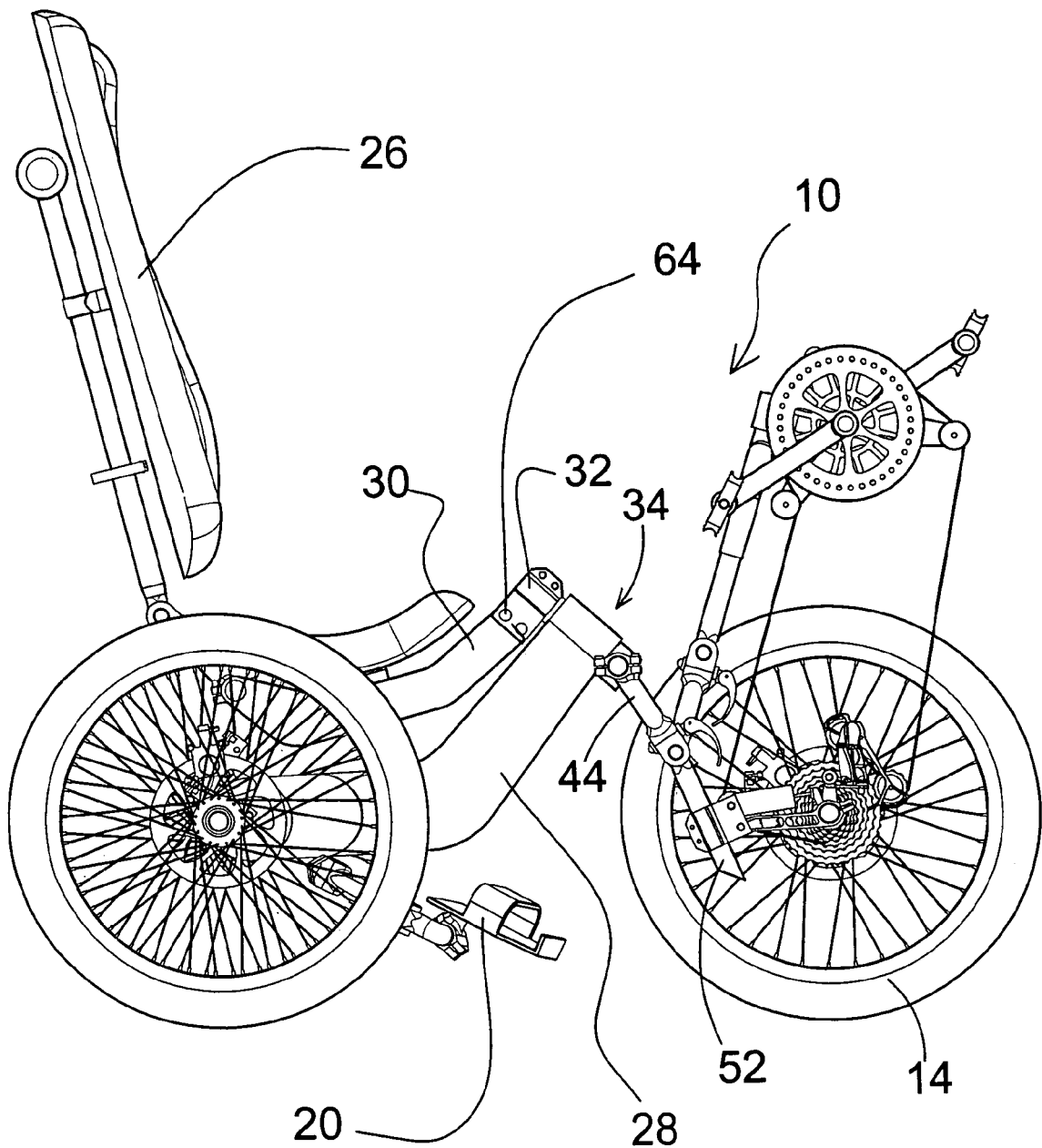
FIG. 7 is a side view of the tricycle.

Turning to FIG. 7, shown therein is a side view of the tricycle 10. Clearly seen are the primary extension clamps 44 and the front wheel columns 52 stemming from the steering pivot column 34. These extension clamps 44 and columns 52 can be independently adjusted for optimum position of the front wheel 14. Also shown is the seat frame pivot 64. Other elements previously disclosed are also shown.

Figure 8:
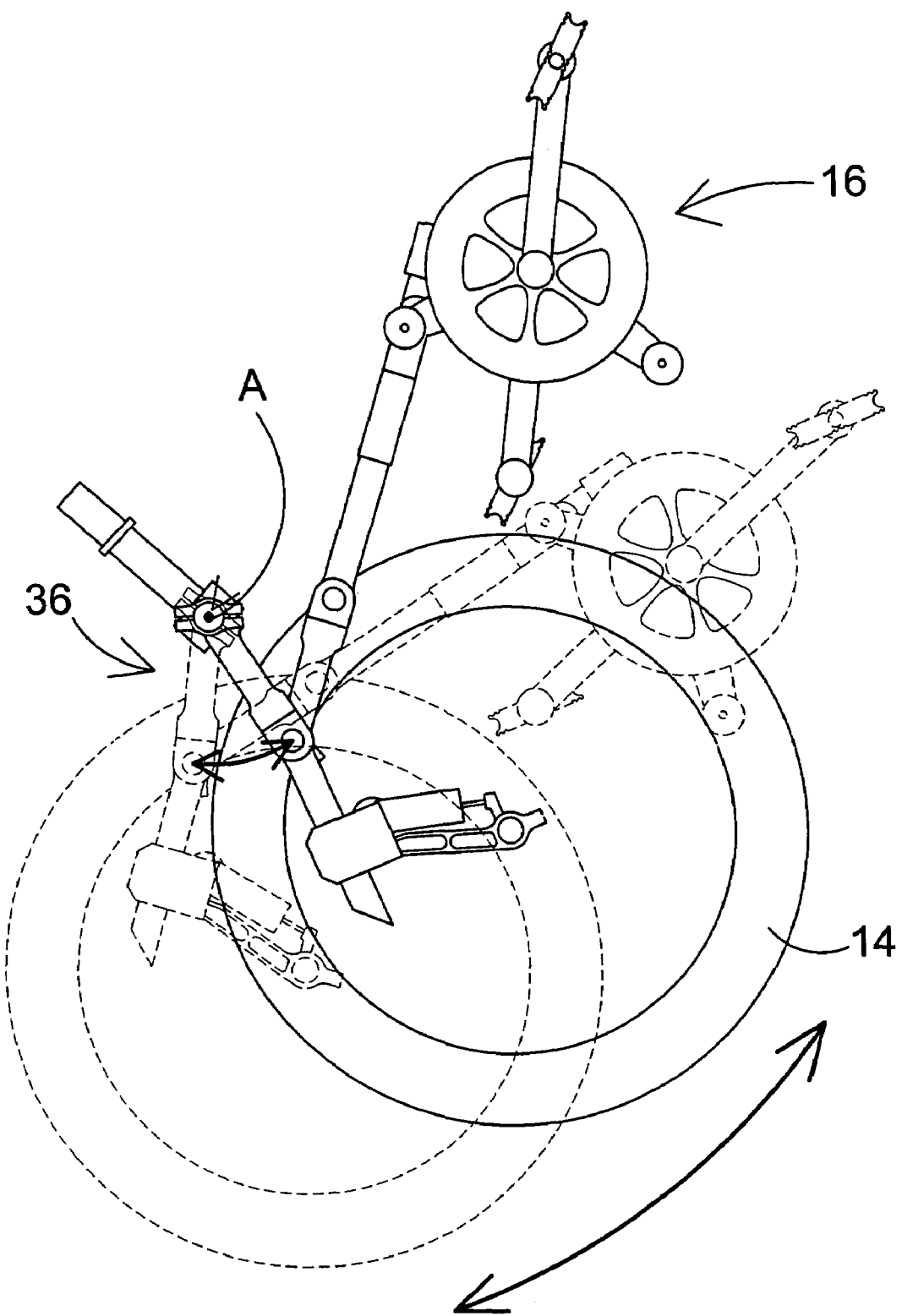
FIG. 8 is a diagram of a pivoting movement of the front wheel.

Turning to FIG. 8, shown therein is a diagram of a pivoting movement of the front wheel 14. The diagram shows the pivoting movement of the front wheel 14 in a vertical plane around the pivot axis A. This pivoting movement rotates the entire wheel assembly 36 and the pedal assembly 16 as one body along the longitudinal axis of the vehicle.

Figure 9:
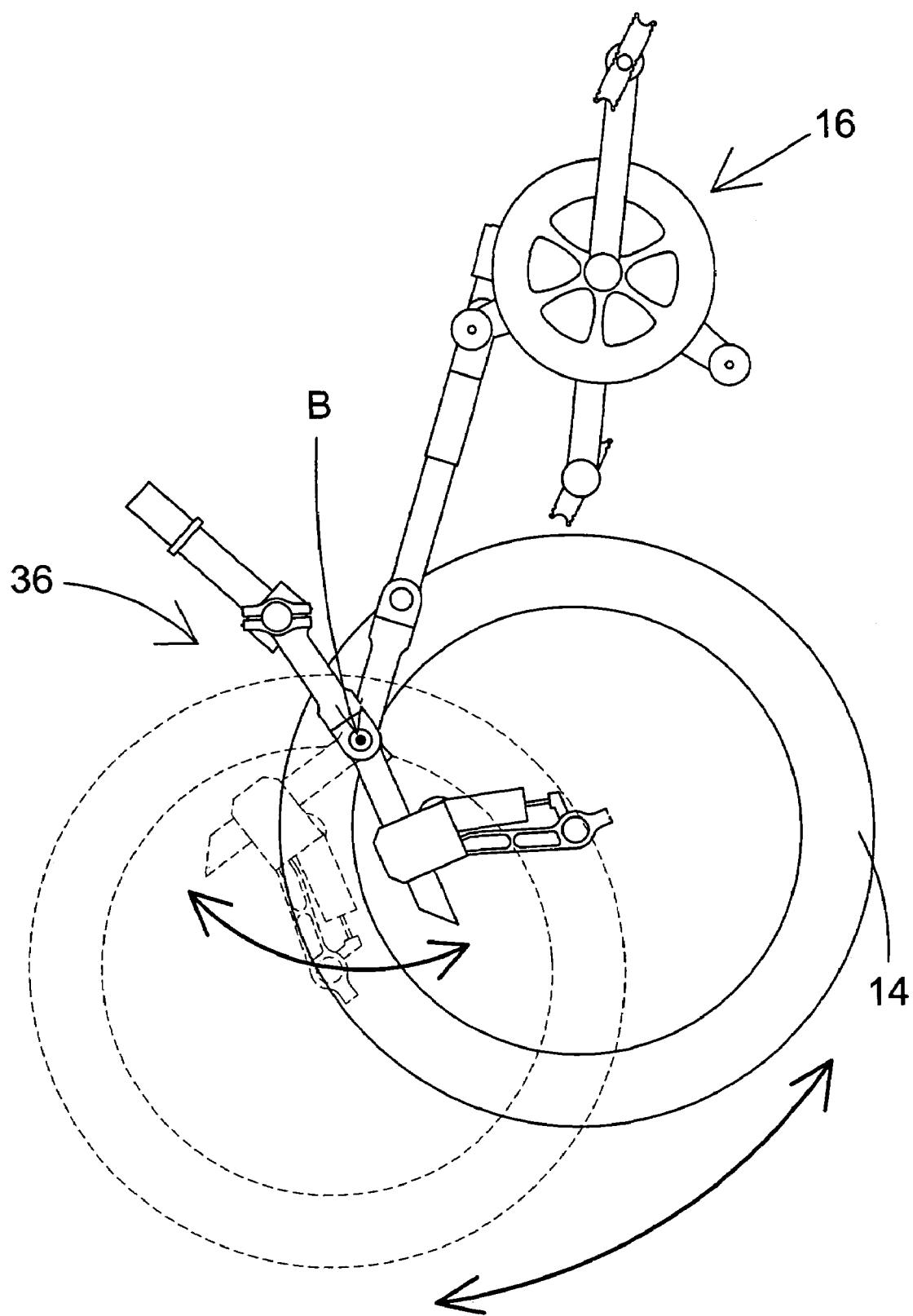
FIG. 9 is a diagram of a pivoting movement of the front wheel.

Turning to FIG. 9, shown therein is a diagram of a pivoting movement of the front wheel 14. The diagram shows the pivoting movement of the front wheel assembly 36 around the pivot axis B. The pivot axis B can be used to rotate the front wheel assembly 36 and the pedal assembly 16 independently or together. This movement is in the vertical plane along the longitudinal axis of the vehicle.

Figure 10:
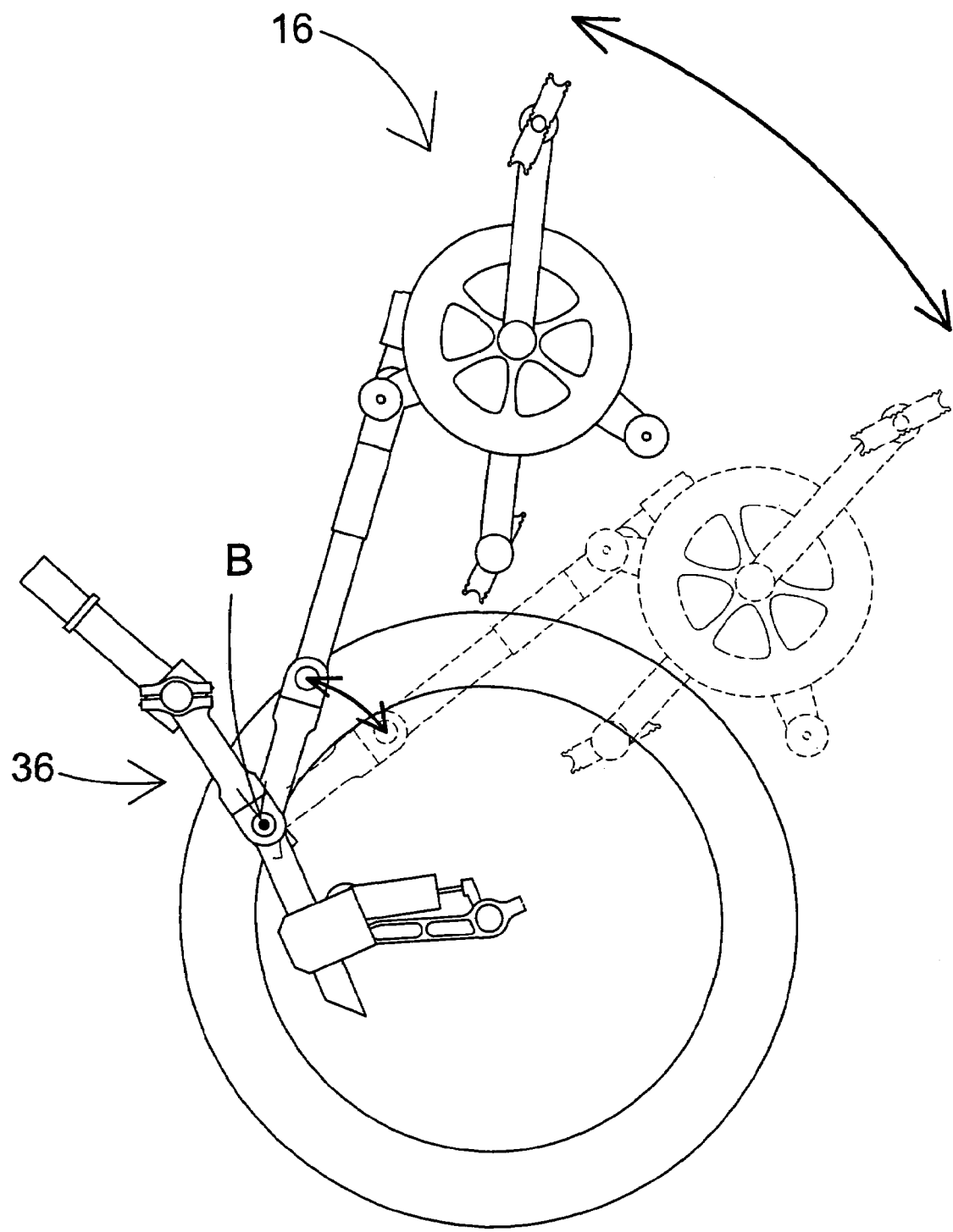
FIG. 10 is a diagram of a pivoting movement of the pedal assembly.

Turning to FIG. 10, shown therein is a diagram of a pivoting movement of the pedal assembly 16. The diagram shows the pivoting movement of the pedal assembly 16 around the pivot axis B. The pivot axis B can be used to rotate the front wheel assembly 36 and the pedal assembly 16 independently or together. This movement is in the vertical plane along the longitudinal axis of the vehicle.

Figure 11:
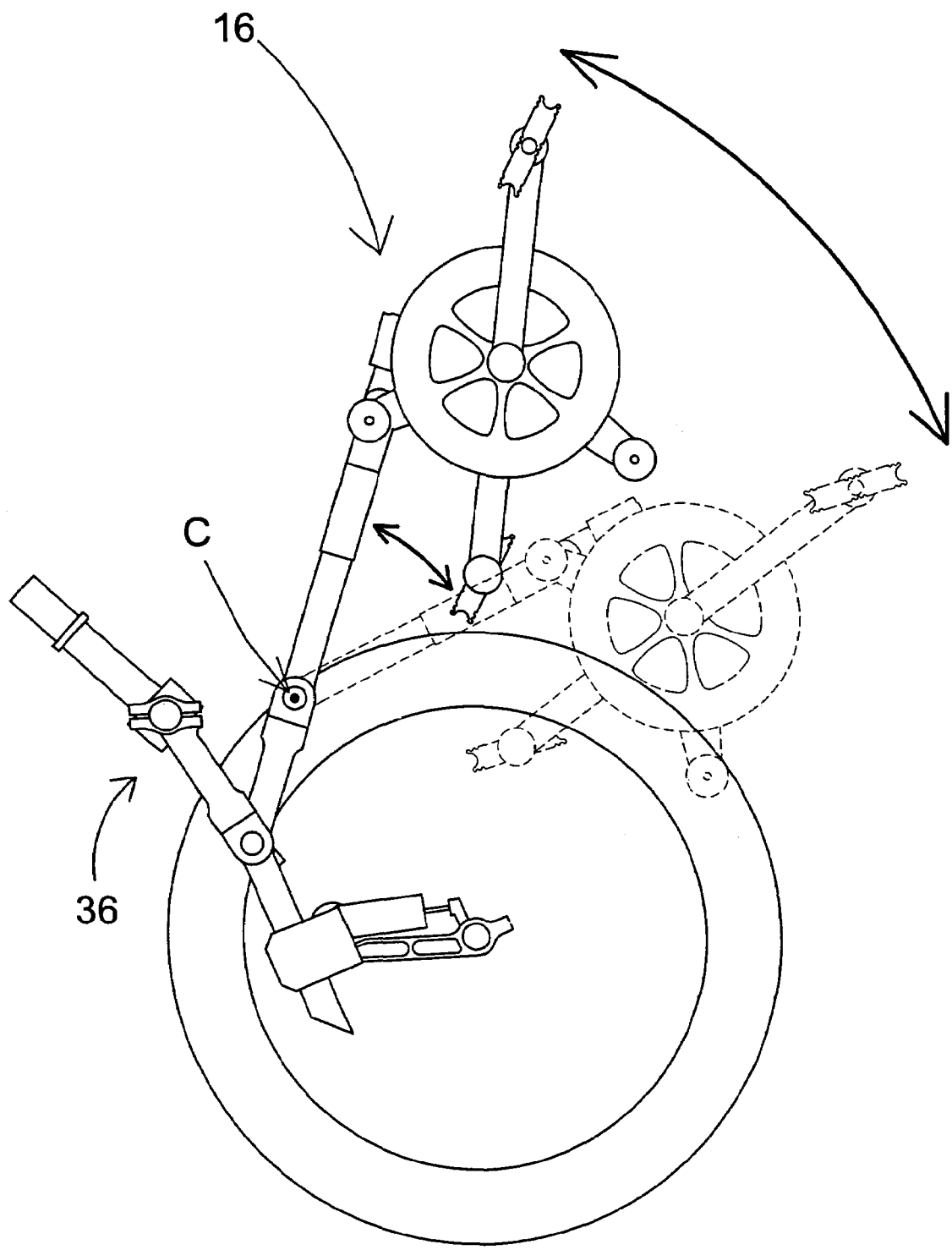
FIG. 11 is a diagram of a pivoting movement of the pedal assembly.

Turning to FIG. 11, shown therein is a diagram of a pivoting movement of the pedal assembly 16. The diagram shows the pivoting movement of the pedal assembly 16 around the pivot axis C. The pivot axis C is used to change the pedal assembly 16 without affecting the front wheel assembly 36. This movement is in the vertical plane along the longitudinal axis of the vehicle.

Figure 12:
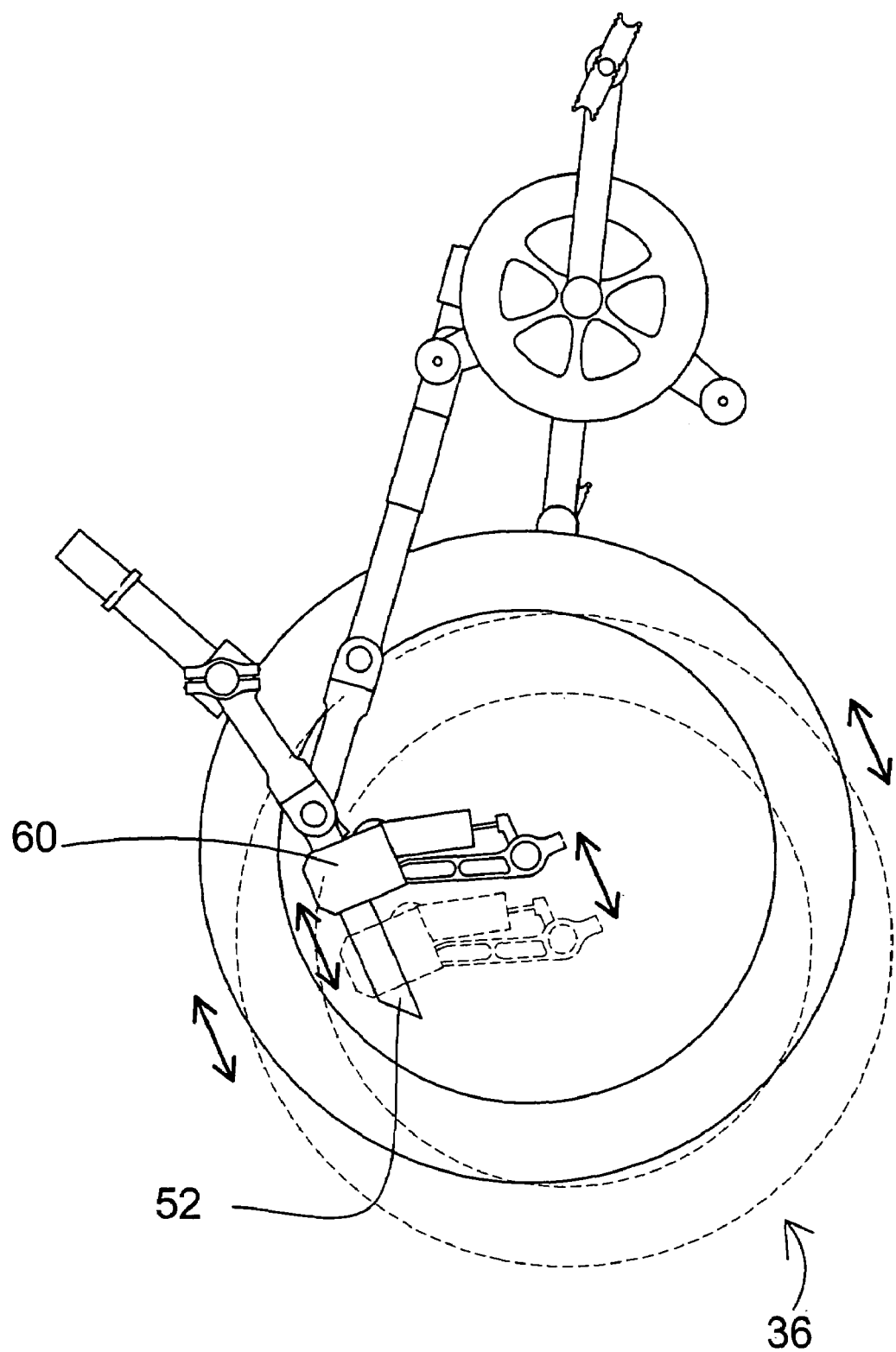
FIG. 12 is a diagram of a sliding movement of the front wheel.

Turning to FIG. 12, shown therein is a diagram of a sliding movement of the front wheel assembly 36. This diagram shows the front wheel arm clamp 60 sliding along the front wheel column 52 carrying the front wheel assembly 36 with it. This movement is in the vertical plane along the longitudinal axis of the vehicle.

Figure 13:
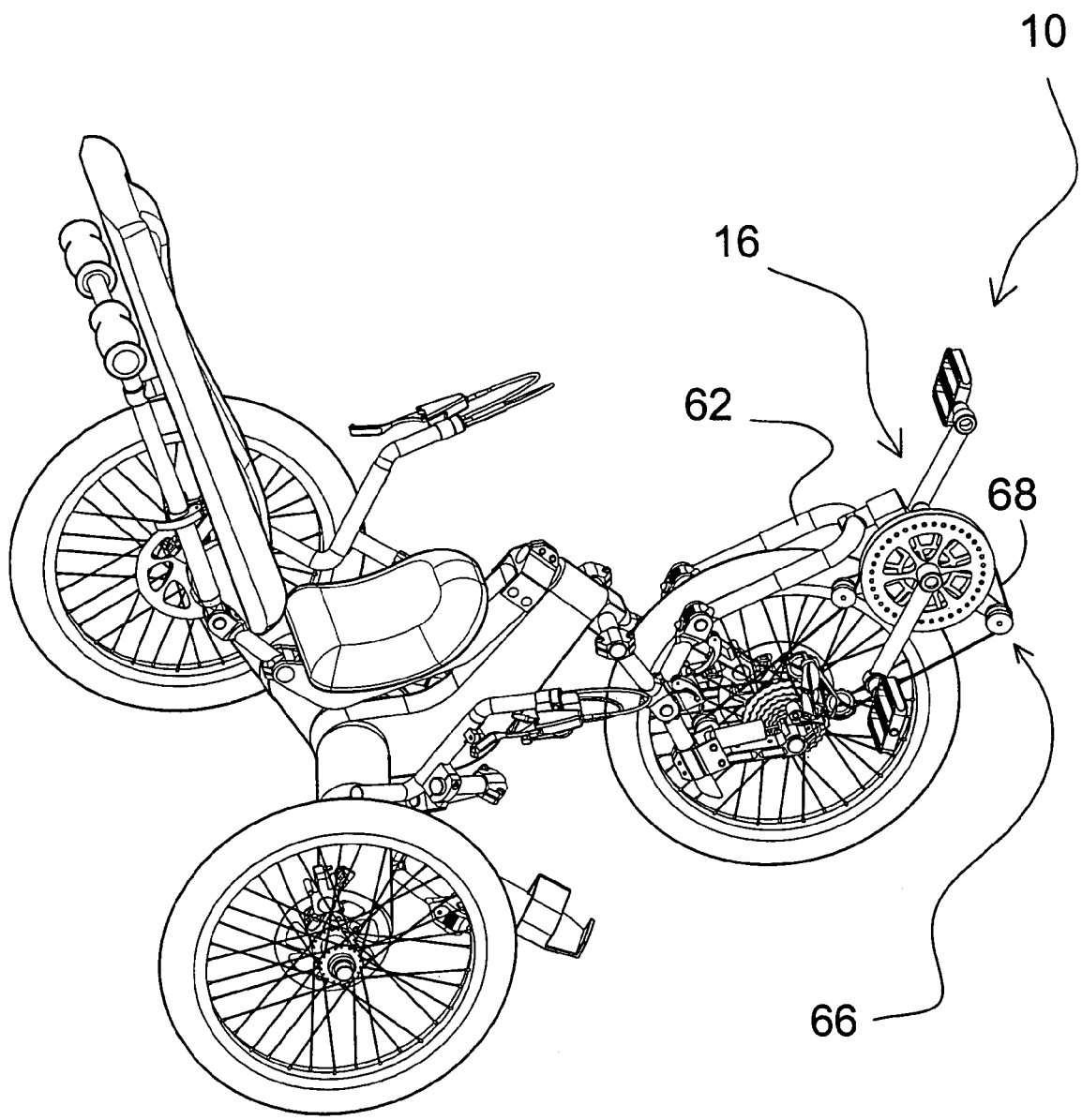
FIG. 13 is a perspective view of the tricycle with the pedal assembly fully extended forward.

Turning to FIG. 13, shown therein is a perspective view of the tricycle 10 with the pedal assembly 16 fully extended forward for foot peddling. All three pivot axes A, B and C as shown in FIGS. 5 and 6 can be used to position the pedal assembly 16 in a comfortable and functional position. Shown here is the pedal assembly 16 fully extended out to the front for comfortable pedaling by the feet. The pedal U-fork 62 allows the pedal assembly 16 to be tilted deep into the forward position. The chain support arm assembly 66 is rotated counterclockwise to keep the drive chain 68 taut or tight.

Figure 14:
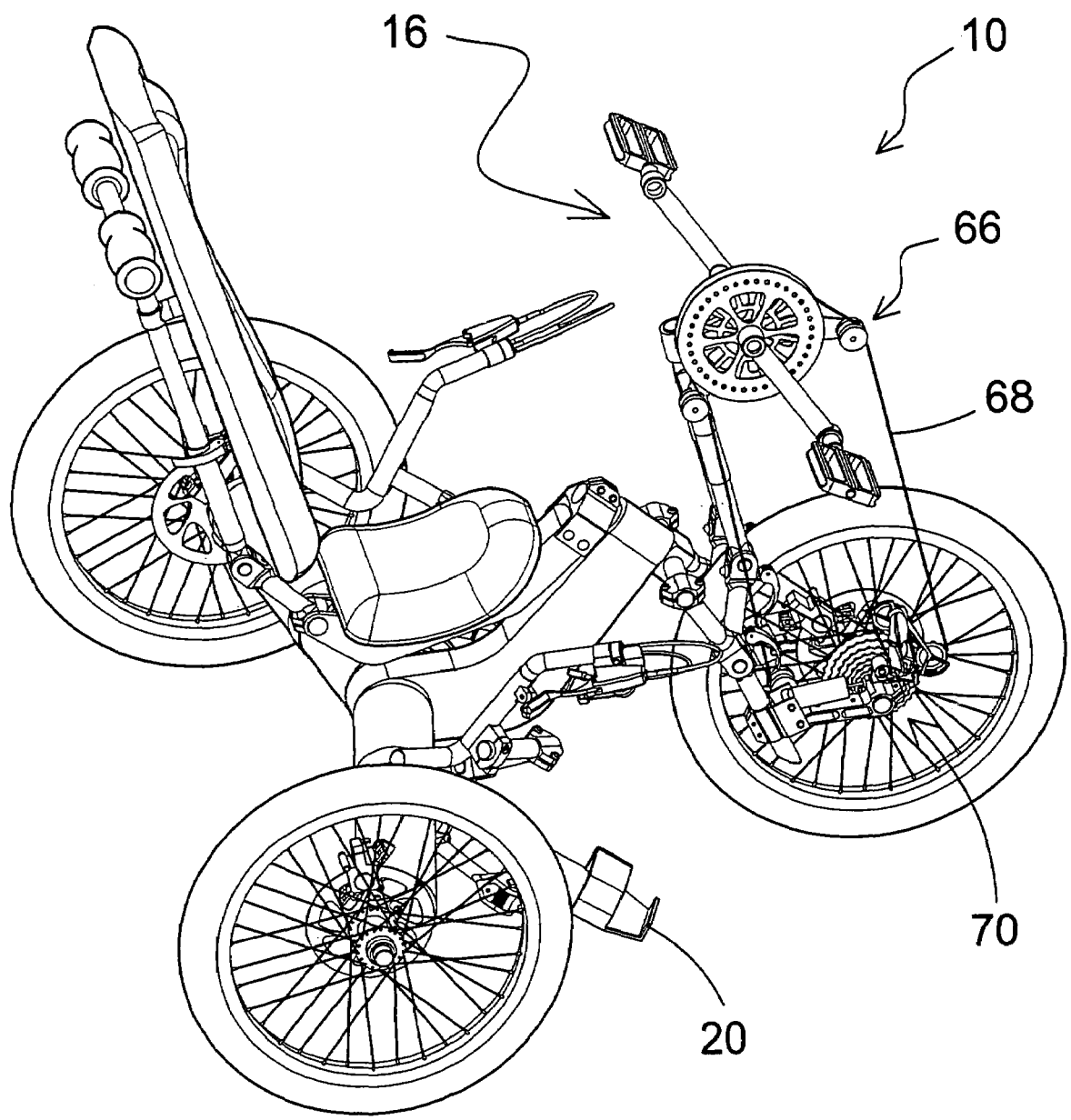
FIG. 14 is a perspective view of the tricycle with the pedal assembly pulled up close to hand pedaling.

Turning to FIG. 14, shown therein is a perspective view of the tricycle 10 with the pedal assembly 16 pulled up close for hand pedaling. When pedaling is done by hand, the rider's feet are on foot rests 20 and provide necessary torque for steering. The chain support arm assembly 66 is relaxed for the drive chain 68 to be stretched upward. The chain support arm assembly 66 works in conjunction with the derailleur assembly 70 in making sure that the drive chain 68 is always properly tensioned.

Figure 15:
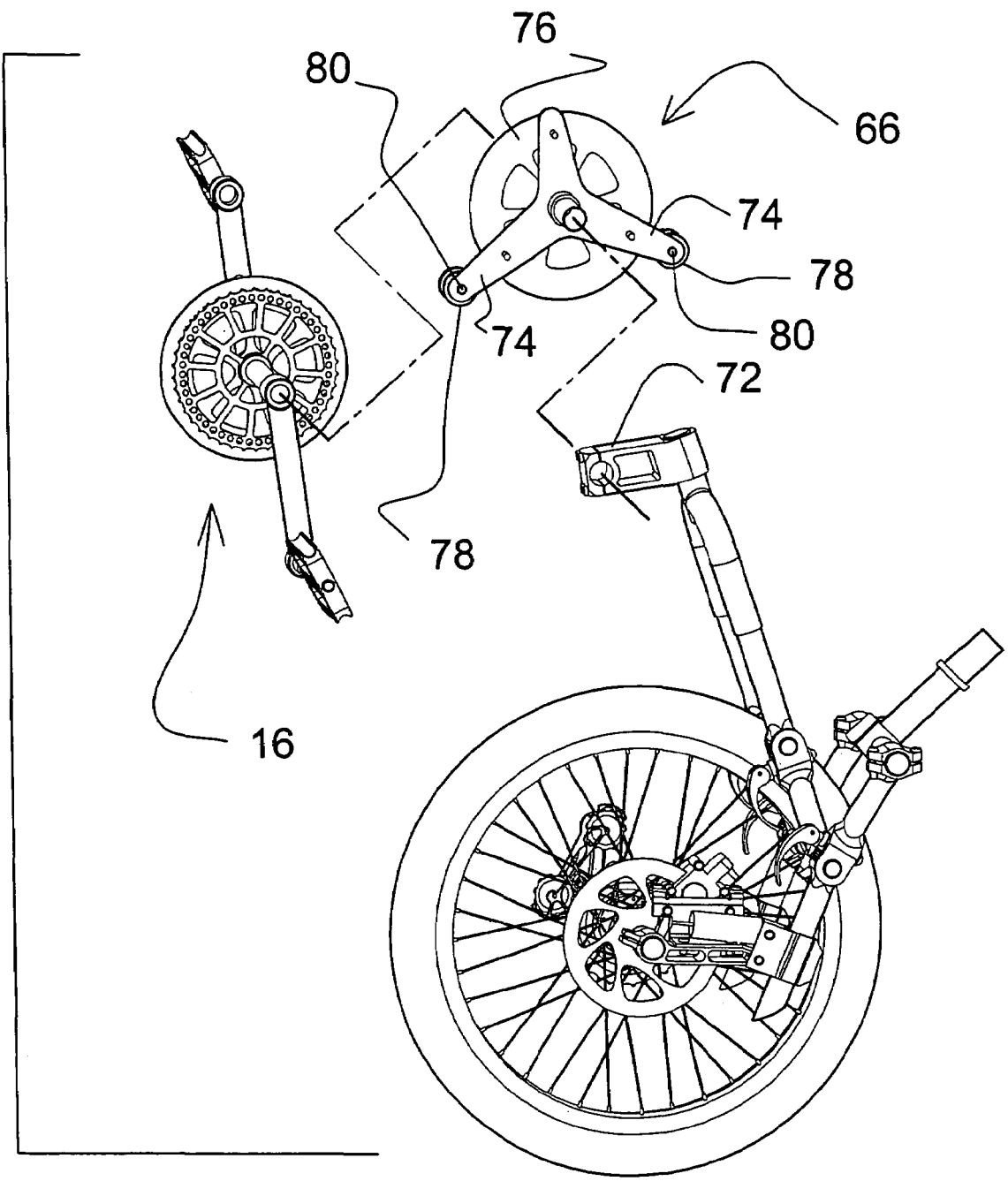
FIG. 15 is an exploded view of the pedal and chain support arm assemblies.

Turning to FIG. 15, shown therein is an exploded view of the pedal assembly 16 and chain support arm assemblies 66. The pedal assembly 16 and the chain support arm assembly 66 are rotationally inserted into the pedal clamp 72, thereby sharing the same axis of rotation. The body of the chain support arm assembly 66 comprises the roller arm body 74 fixed to the chain guard 76. A chain roller 78 on a roller pin 80 is rotationally fixed at the ends of each of the two roller arms 74. The chain support arm 66 employs means to fix it in position once adjusted.

Figure 16:
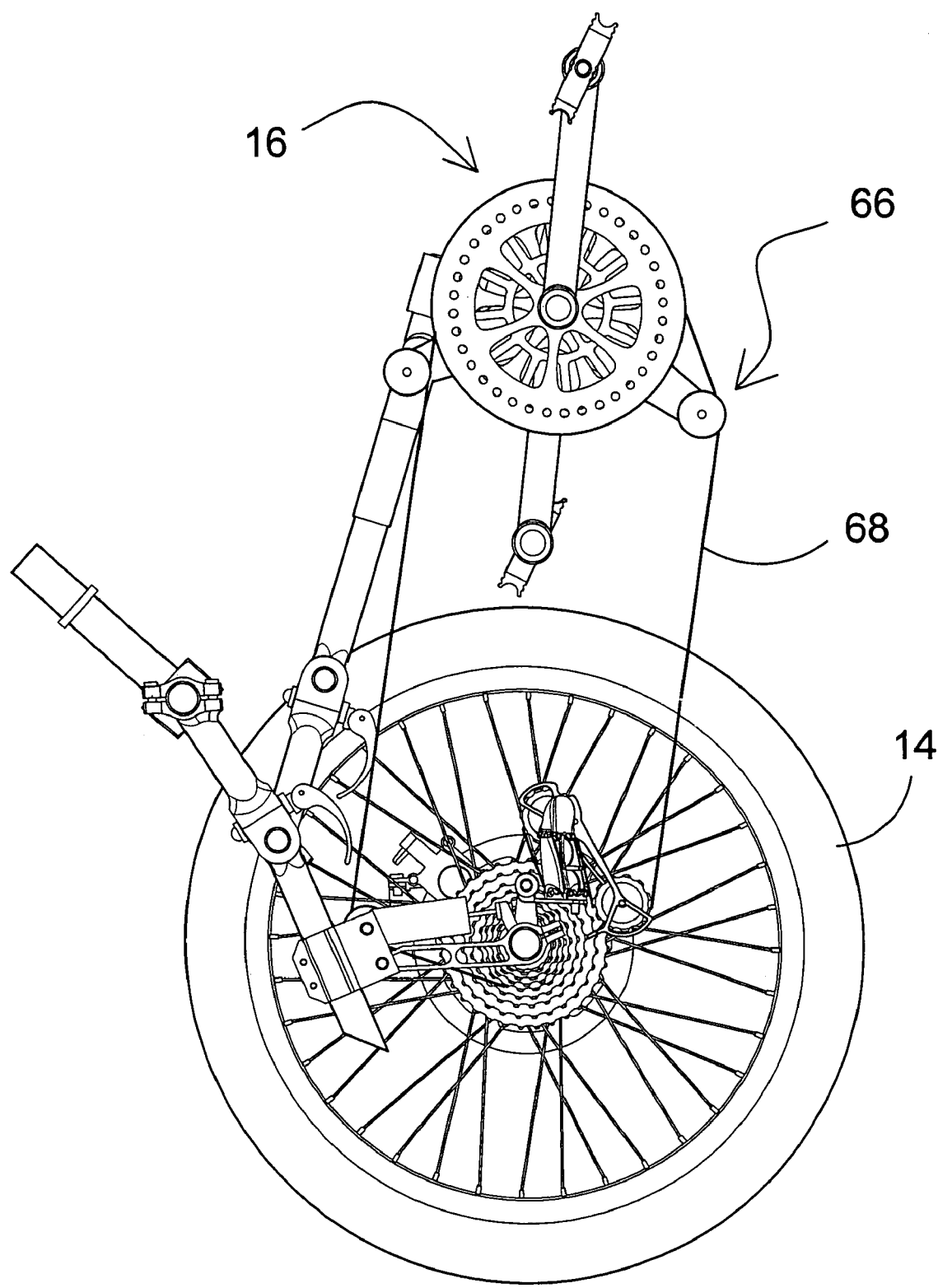
FIG. 16 is a side view of the front wheel and pedal assembly in which the chain support arm assembly is relaxed for maximum extension of the drive chain.

Turning to FIG. 16, shown therein is a side view of the front wheel 14 and pedal assembly 16 in which the chain support arm assembly 66 is relaxed for maximum extension of the drive chain 68. The chain support arm assembly 66 and the pedal assembly 16 share a common axis of rotation. The chain support art assembly 66 can be fixed in position frictionally or by spring tension.

Figure 17:
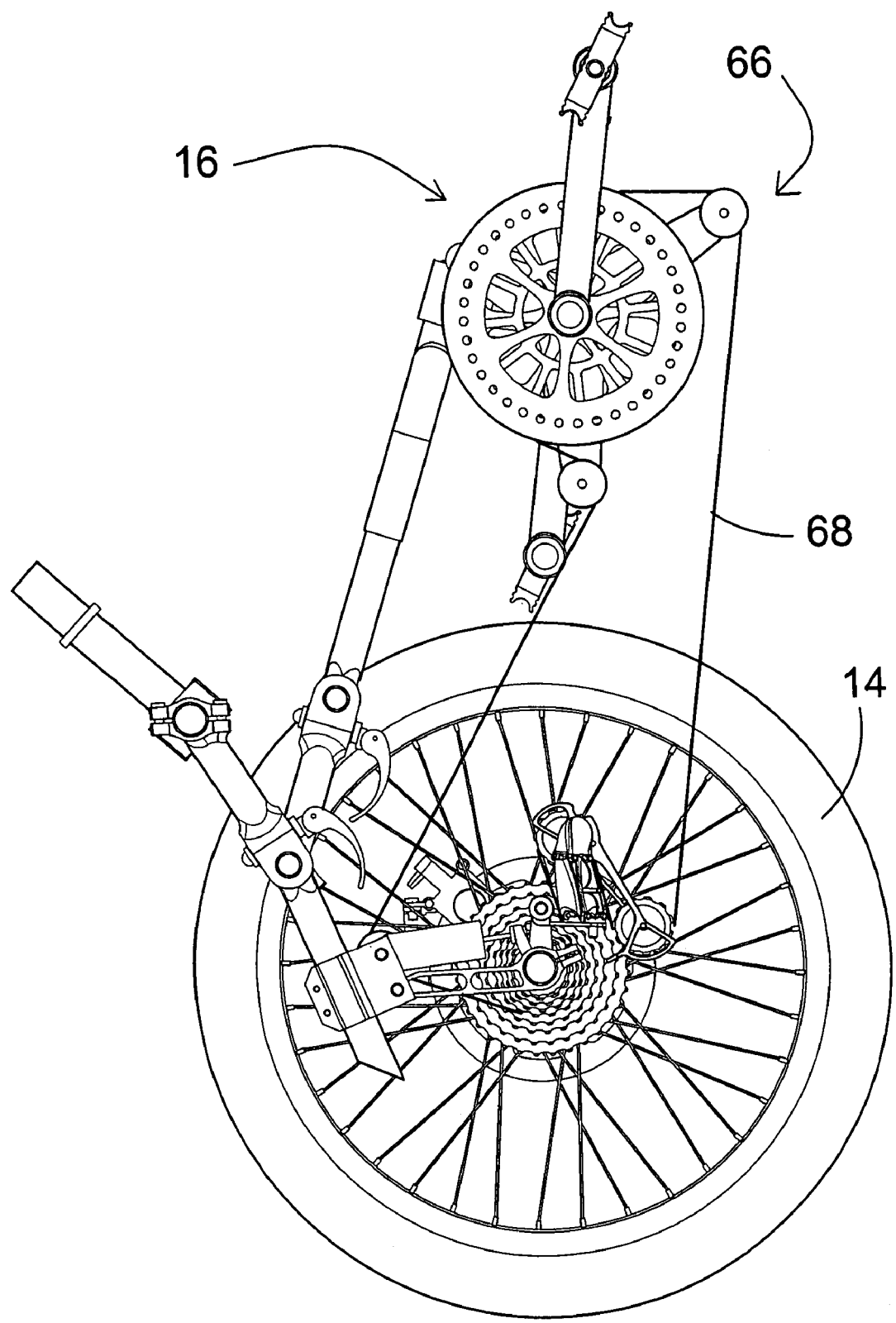
FIG. 17 is the same view of the front wheel and pedal assembly in FIG. 16 with the chain support arm assembly tightened.

Turning to FIG. 17, shown therein is the same view of the front wheel 14 and pedal assembly 16 in FIG. 16 with the chain support arm assembly 66 tightened. Turning the chain support arm assembly 66 counterclockwise tightens the drive chain 68. This is shown in this Figure with the pedal assembly 16 in the same position as in FIG. 16 for comparison. Tightening the drive chain 68 and lowering of the pedal assembly 16 will usually be done in conjunction.

Figure 18:
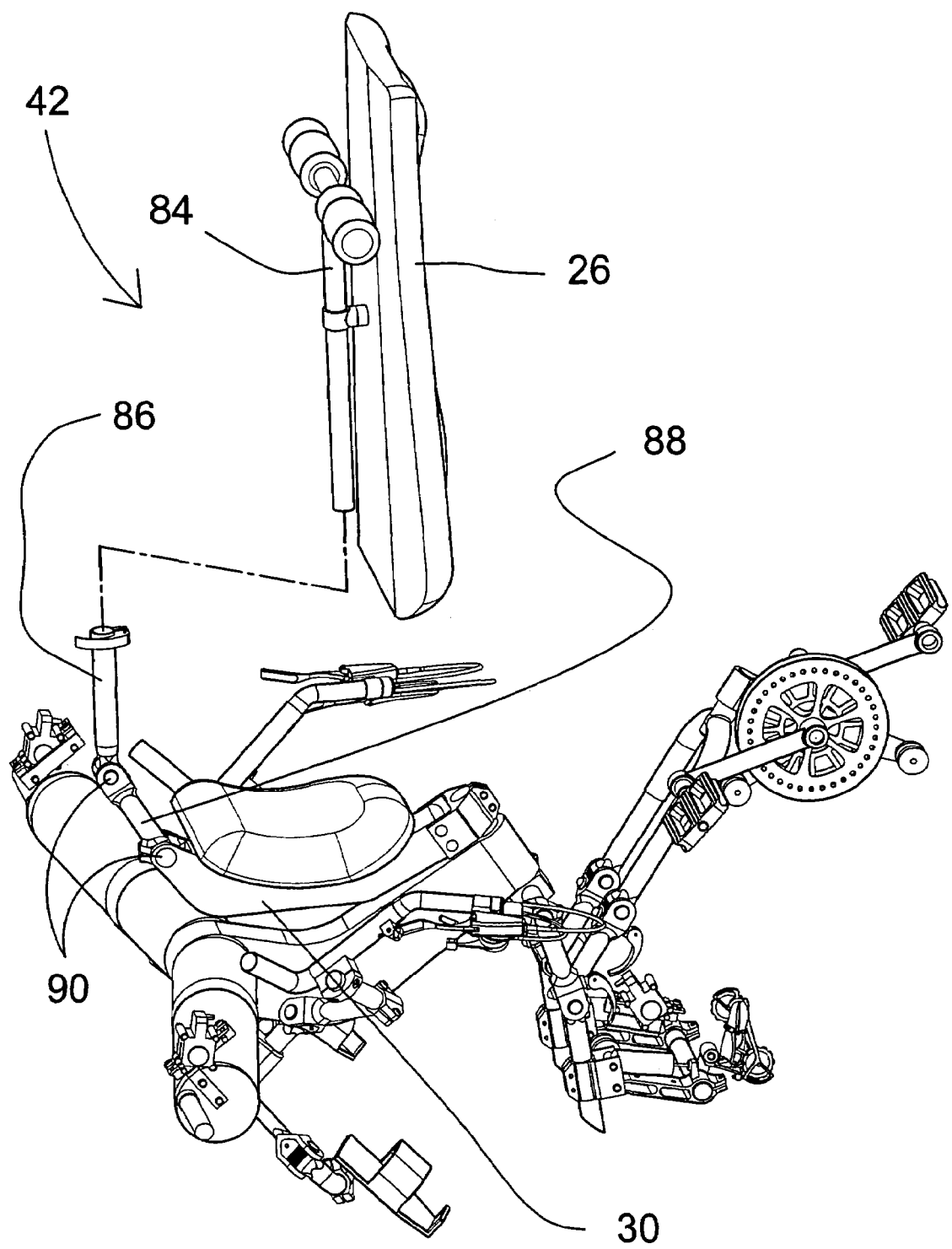
FIG. 18 is an exploded view of the back seat assembly.

Turning to FIG. 18, shown therein is a perspective view of the back seat assembly 42. The tricycle is shown here without the wheels for a clearer view. The back seat frame 84 with back seat 26 attached thereto is inserted into the back seat column 86, which is pivotably joined to the back seat extension clamp 88. The back seat extension clamp 88 is, in turn, pivotably connected to the seat frame 30. This configuration comprises two back seat joints 90 for adjusting the back seat 26.

Figure 19:
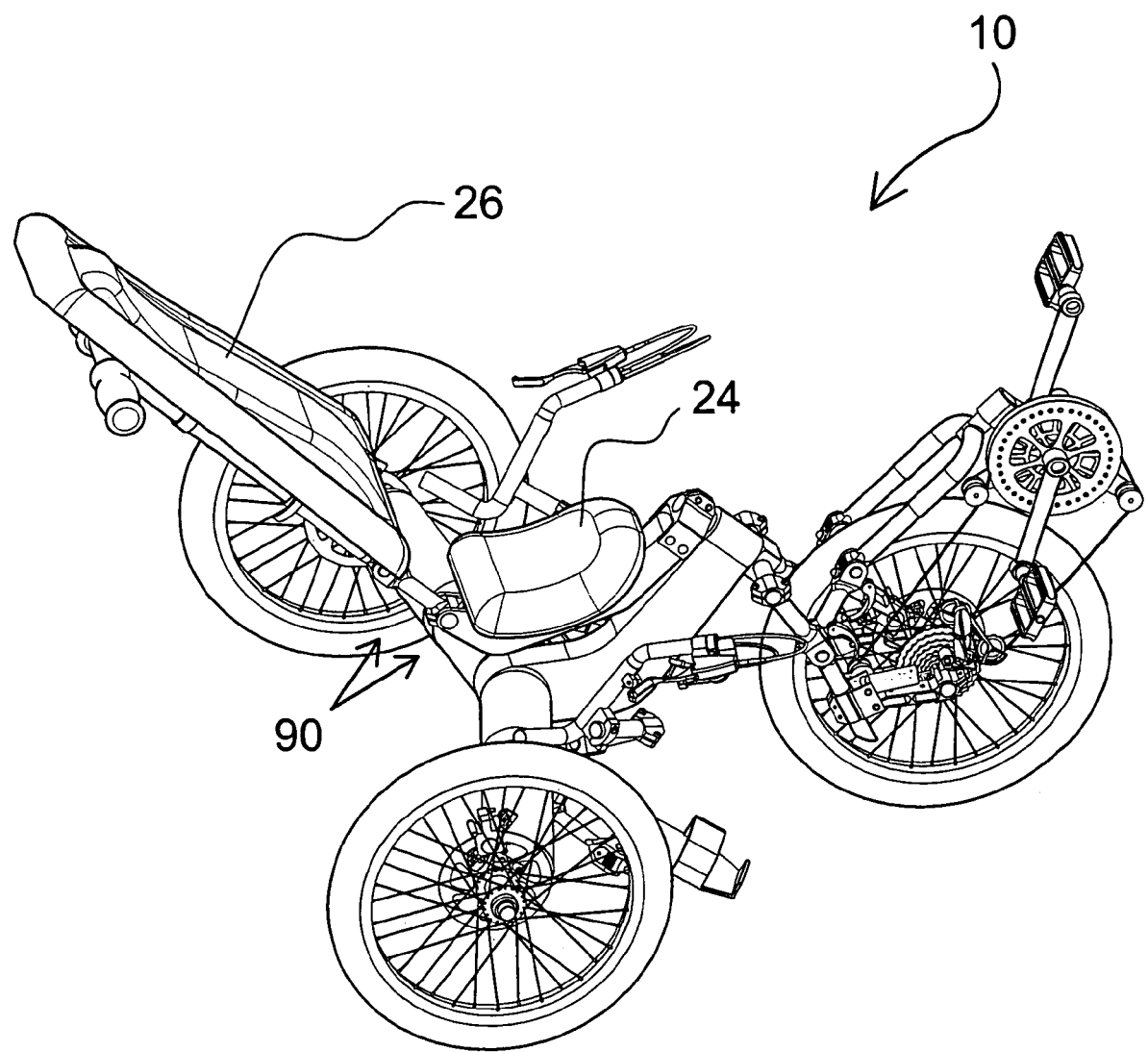
FIG. 19 is a perspective view of the tricycle with the back seat tilted back.

Turning to FIG. 19, shown therein is a perspective view of the tricycle 10 with the back seat 26 tilted back. The tricycle 10 is shown here with the back seat 26 titlted back for a comfortable recumbent riding. Besides changing the angle of the back seat 26, the two back seat joints 90 can be used in unison to bring the back seat forward and back. Also shown is bottom seat 24.

Figure 20:
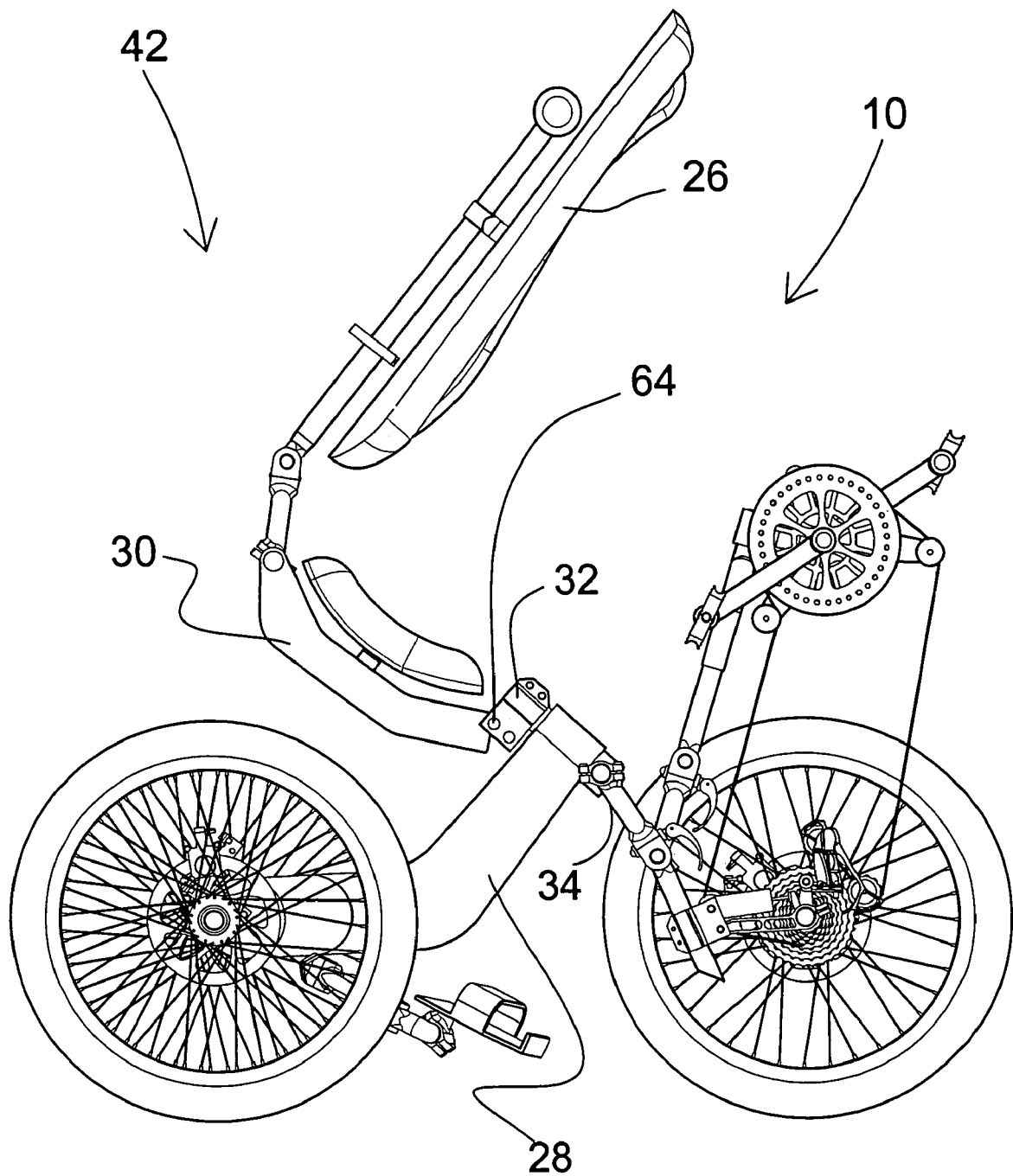
FIG. 20 is a side view of the tricycle with the seat assembly lifted up.

Turning to FIG. 20, shown therein is a side view of the tricycle 10 with the seat assembly 42 lifted up. The seat frame 30 is pivotably attached at 64 to the seat frame clamp 32, thereby allowing the seat assembly 42 to be lifted up. The seat frame clamp 32 itself is ridgily fixed to the steering pivot column 34. Also shown are the back seat 26, main frame 28 and seat frame pivot 64.

Figure 21:
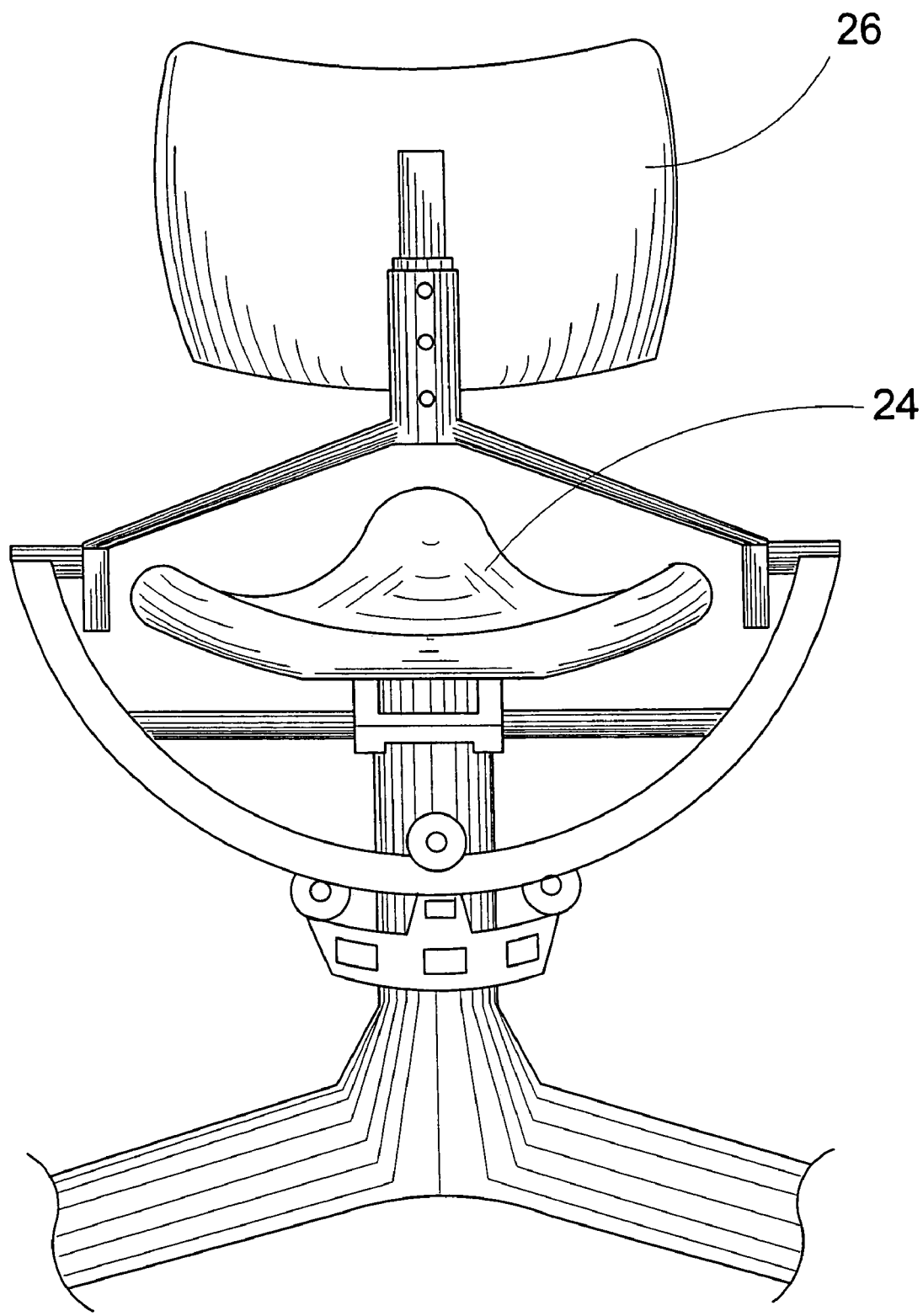
FIG. 21 is a view of an alternate seat.

Turning to FIG. 21, shown therein is a view of an alternate seat design. The tricycle of the present invention can be provided with alternate style seats 24, 26 as the one illustrated.

Figure 22:
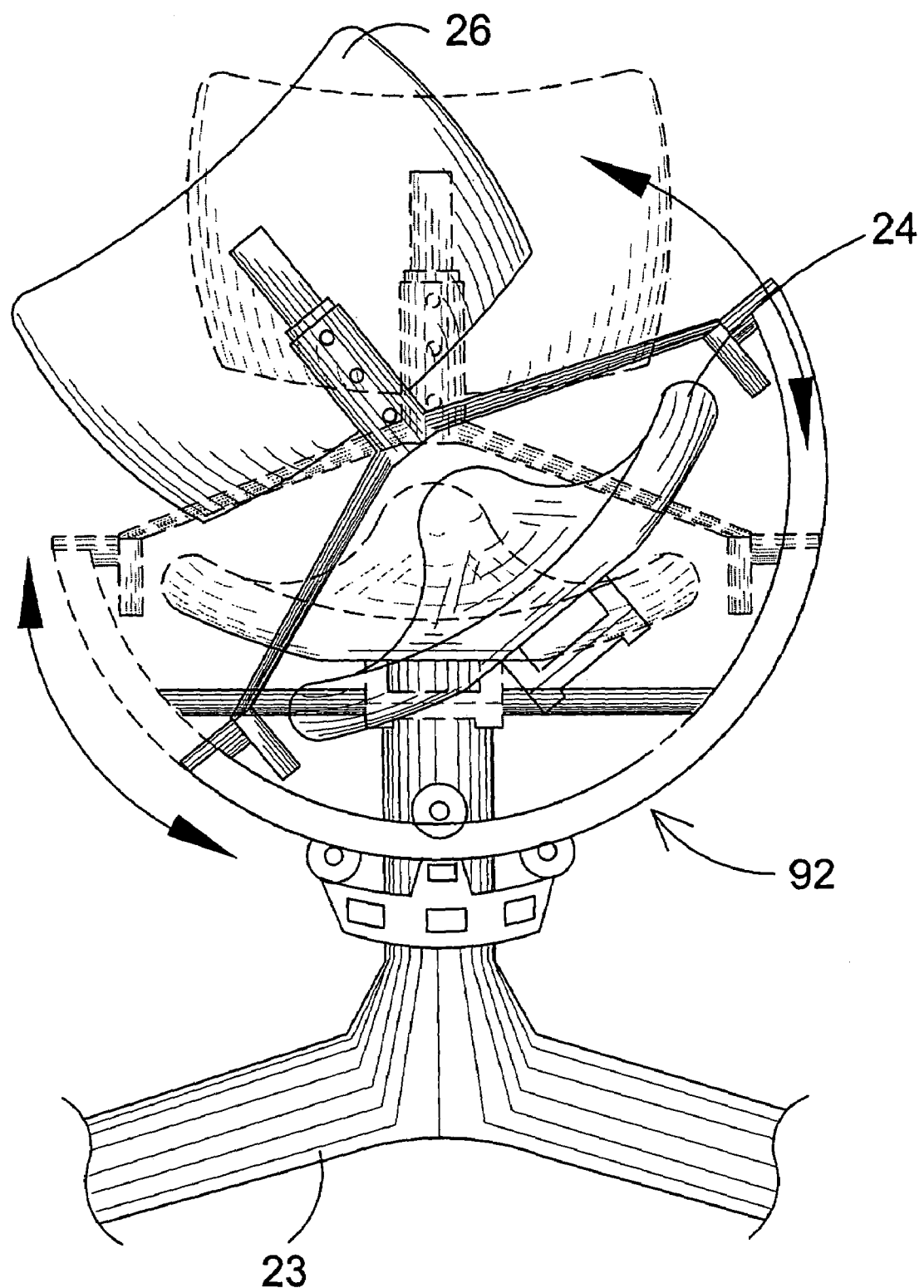
FIG. 22 is a view of an alternate seat in moveable positions.

Turning to FIG. 22, shown therein is an alternate seat 24, 26 in movable positions. FIG. 22 is an illustrative view of an alternate seat 24, 26 of the present invention showing the moveability of the seat 24, 26 as it rides within a slide retainer 92 attached to the rear axle 23. Seats 24, 26 are fixed together and partially rotate in a vertical plane perpendicular to the longitudinal axis of the vehicle.

Turning to FIGS. 23–27, there is shown therein an alternative embodiment 100 of the tricycle which incorporates a capability for adjusting the road clearance, adjusting the camber angle of the rear wheels 102, and for folding the tricycle 100 into a compact configuration.

Figure 23:
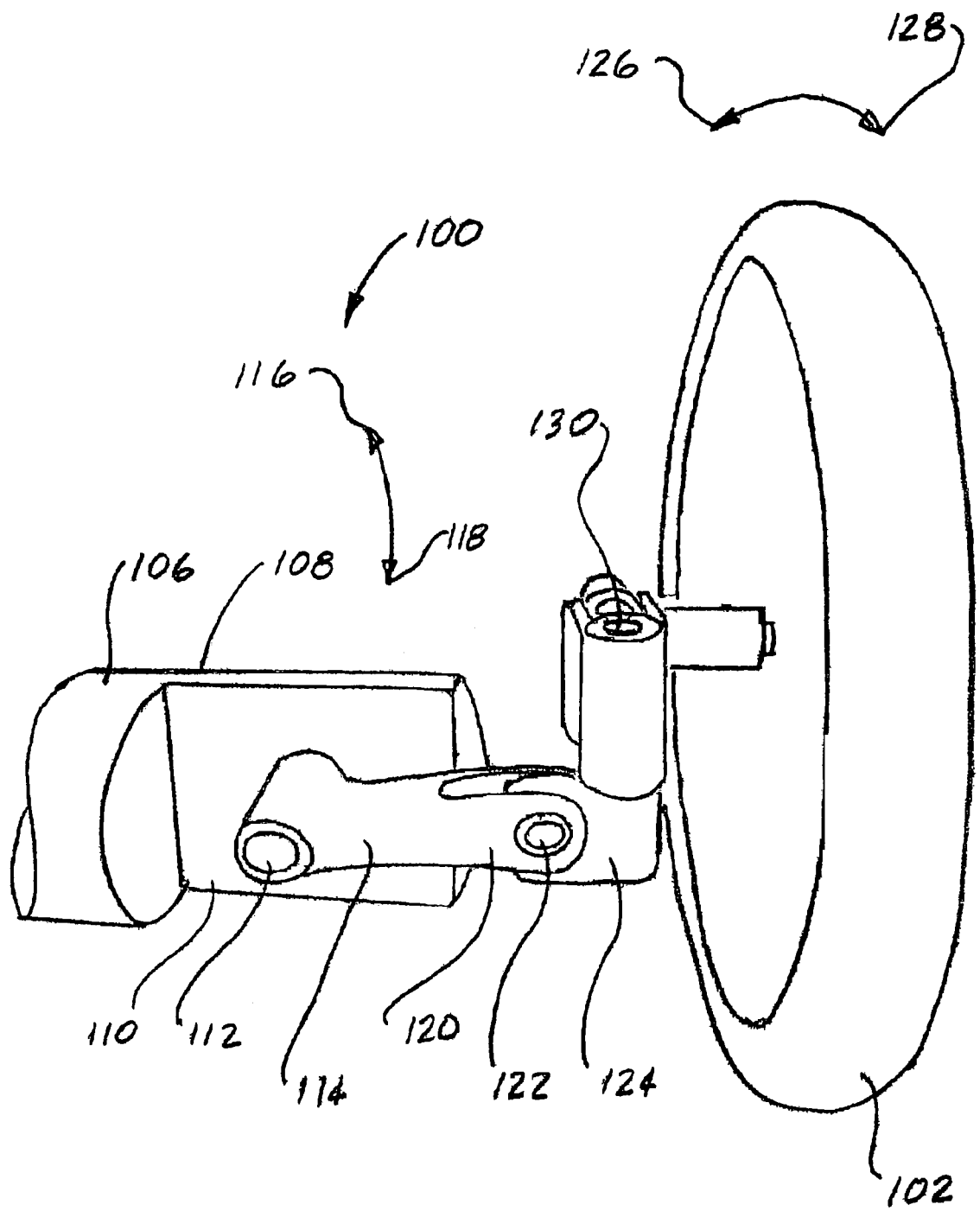
FIG. 23 is an enlarged, simplified and perspective fragmentary view of another alternate embodiment of the invention showing links which facilitate adjustment of ground clearance and adjustment of the camber angle of the rear wheels.

FIG. 23, which is a view looking toward the rear of the triangle 100, shows that the axle 106 has a step portion 108 which includes the flat portion 110. The step portion 108 supports a lockable pivot 112 which is connected to a link 114. The link 114 may be adjusted in the directions shown by the arrows 116, 118 to adjust the ground clearance of the tricycle 100. This feature enables a user to easily accommodate various road conditions such as rough off-road conditions, smooth pavement and various degrees of intermediate road conditions.

The outer end 120 of the link 114 includes a lockable pivot 122 which connects the link 114 and the block 124. The lockable pivot 122 facilitates adjustment of the camber angle or angle of the wheel 102 relative to a vertical plane, in the directions shown by the arrow 126, 128. This adjustment enables a user to adjust the riding and stability characteristics of the tricycle 100 for special riding conditions such as racing.

Figure 25:
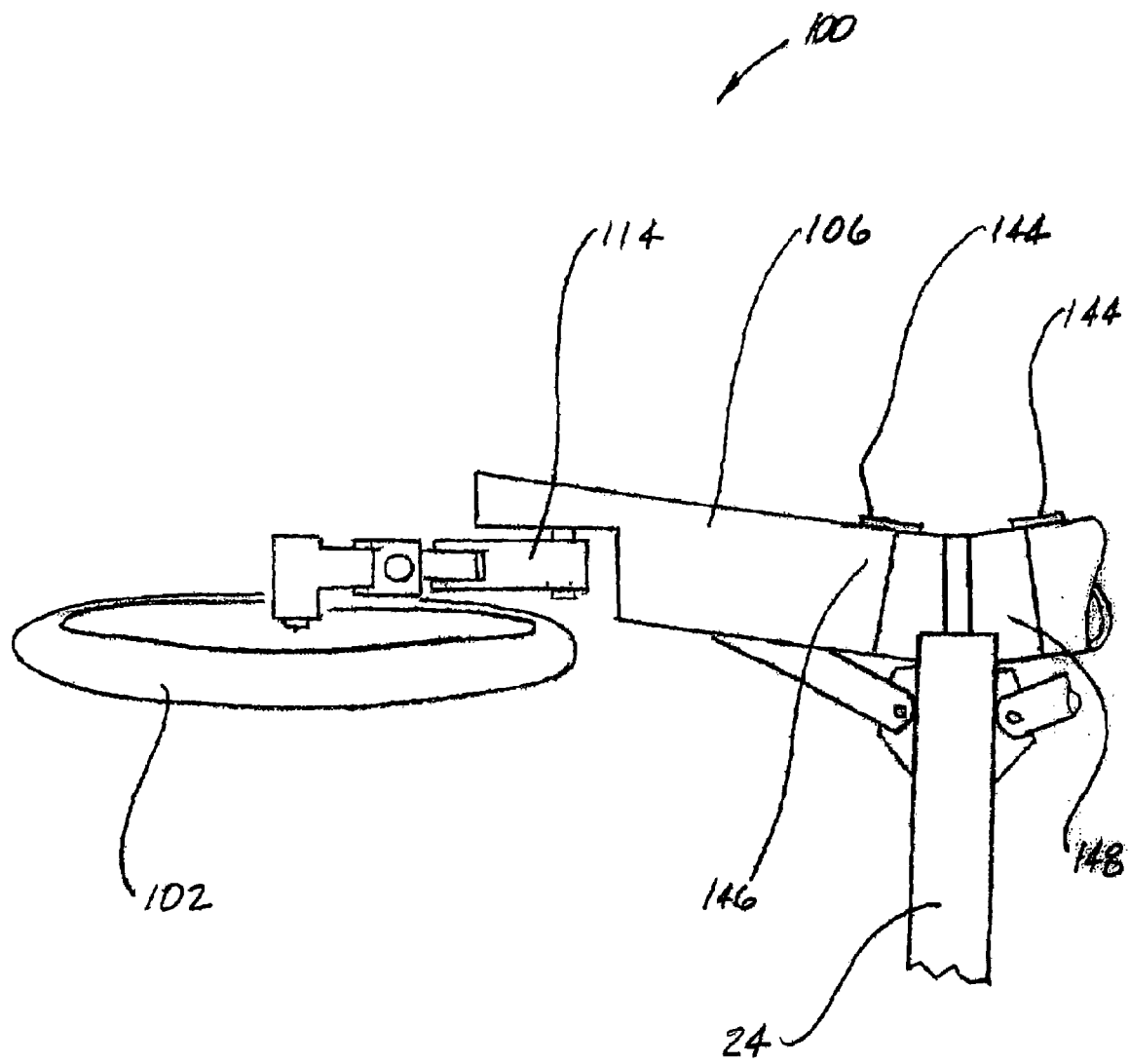
FIG. 25 is a fragmentary top view of the embodiment of FIG. 23 showing the start of the process of folding the tricycle.

The block 124 includes a lockable pivot 130 which enables the rear wheels 102, 104 to be folded into general alignment with the axle 106 as shown in FIG. 25 for the purpose of folding the triangle 100 in a manner which will be presently described.

Figure 24:
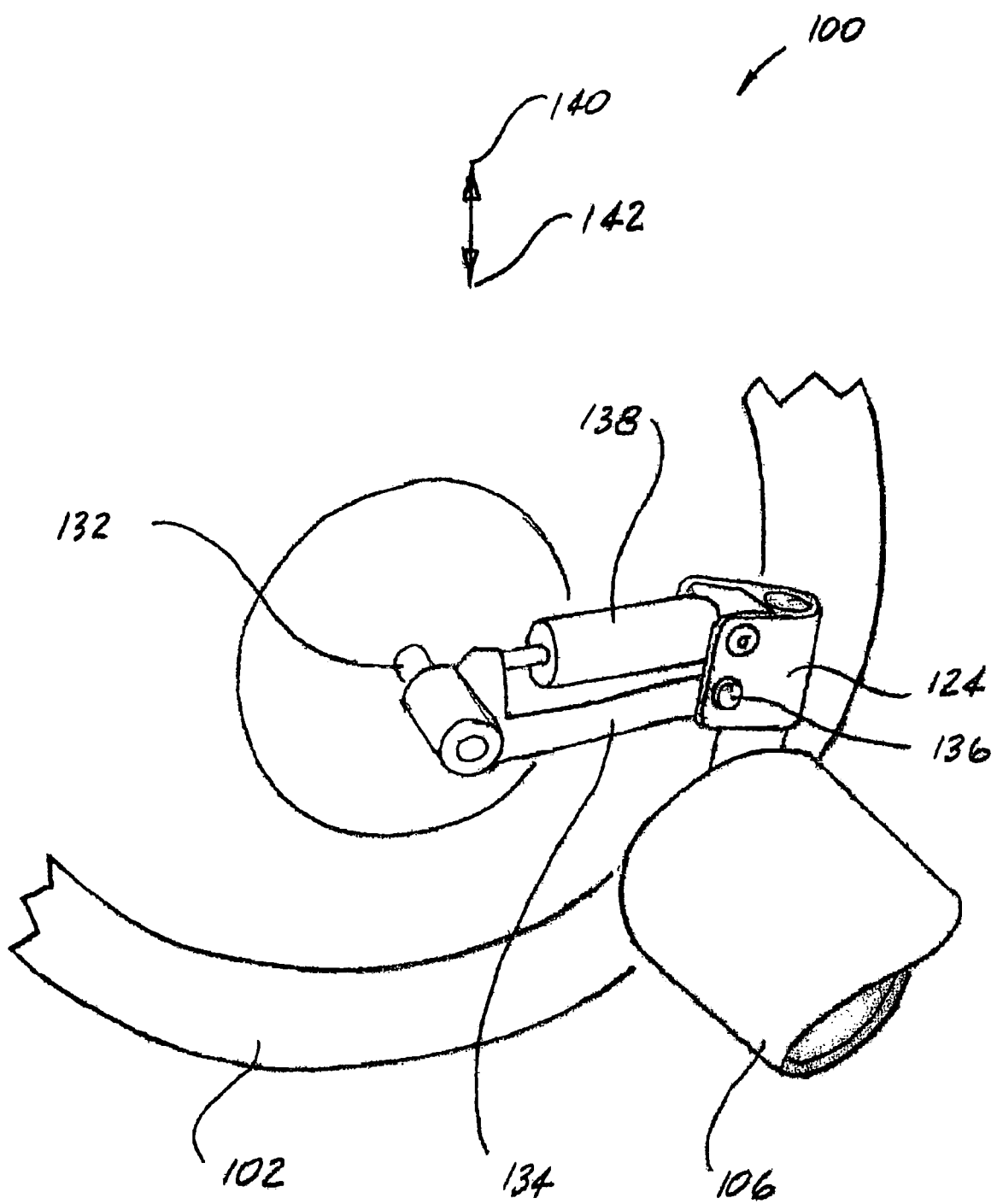
FIG. 24 is a simplified fragmentary perspective view of the embodiment of FIG. 23 showing a shock absorber for the rear wheels.

FIG. 24 shown the rear wheel shaft 132 being supported by a link 134 which is connected to the block 124 by means of the pivot 134.

The link 134 and the block 124 are also connected by a shock absorber 138 which absorbs shocks by dampening the motion of the wheel 102 in the vertical direction as indicated by the arrows 140, 141 in FIG. 24. The shock absorber 138 improves the riding characteristics of the tricycle 100 and facilitates use in off-road and other adverse conditions. The various lockable pivots are similar to the fixedly pivotable joints A, B and C which have locking means 37 as described above.

Figure 26:
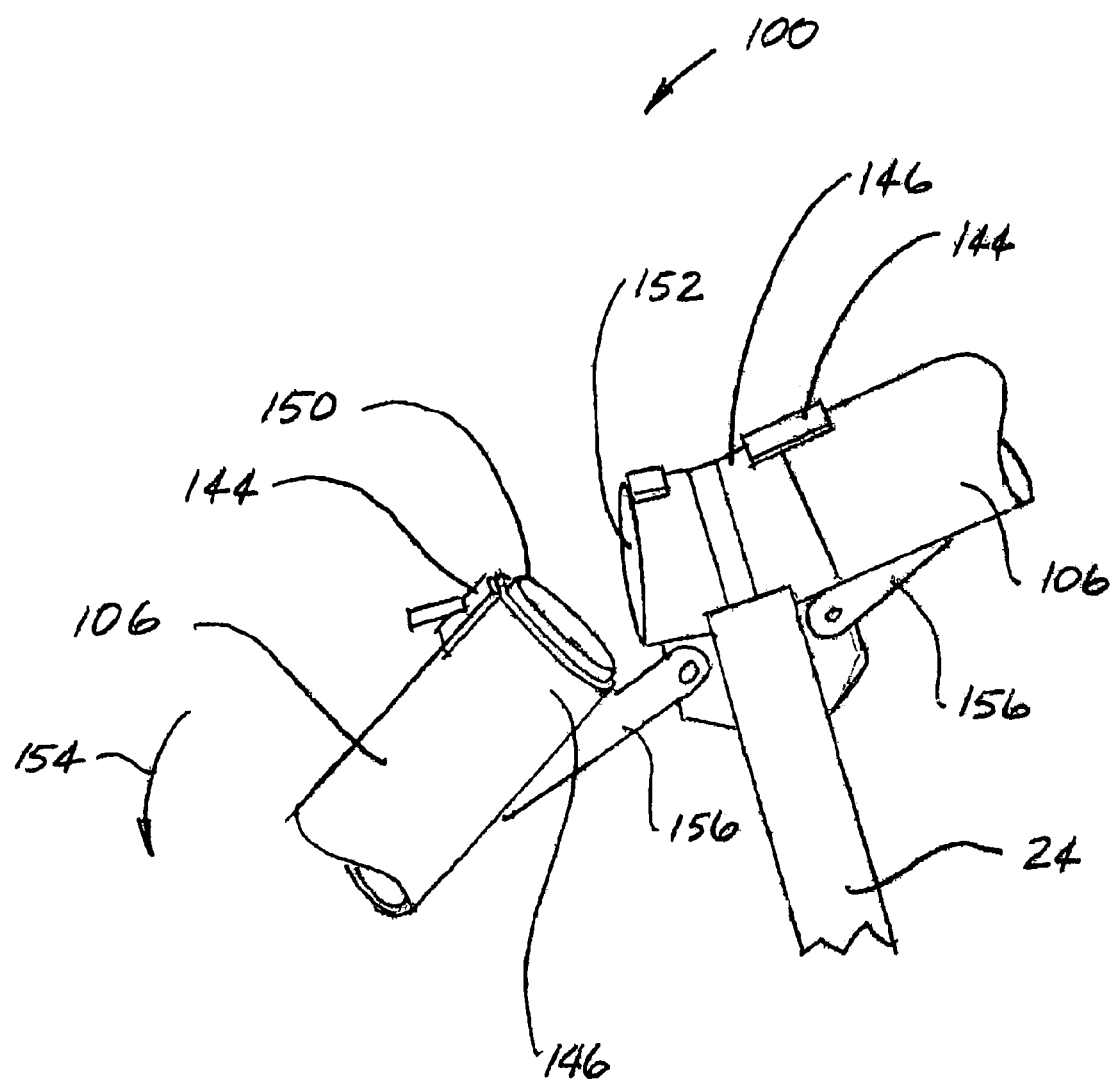
FIG. 26 is a fragmentary top view similar to FIG. 25 showing the continuation of the process of folding the tricycle.

FIG. 25 is a simplified view showing the first step in the process of folding the tricycle 100. The axle 106 as shown in FIG. 25 includes a latch 144 which attaches the end 146 of the axle 106 to the central axle support 148. The axle 106 and the central axle support 148 are each tubular members and as shown in FIG. 26, the end 146 of the axle 106 has a portion 150 which projects into the opening 152 of the central axle support 146. The central axle support 148 is connected to the main frame 28 which has been previously described.

As shown in FIG. 25, the rear wheel 102 has been pivoted to a position which is generally in line with the axle 106.

FIG. 26 shows the axle 106 pivoted away from the central axle support 148, in the direction shown by the arrow 154, toward the front of the tricycle 100. The axle 106, the central axle support 148, and the main frame 28 are connected by the links 156.

Figure 27:
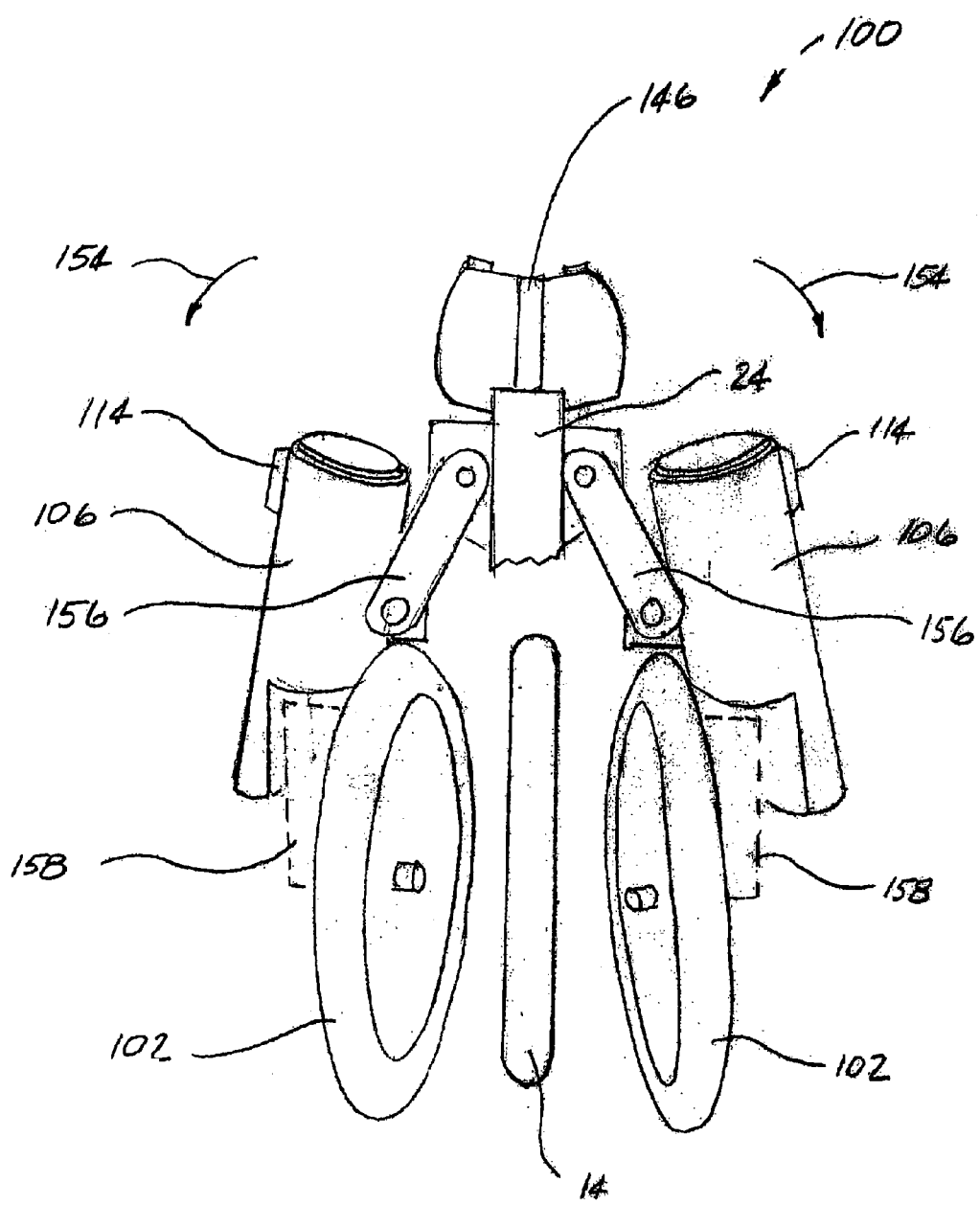
FIG. 27 is a simplified schematic front view of the tricycle of FIG. 23 with the tricycle shown in the folded configuration.

FIG. 27 is a simplified front view of the tricycle 100 in which selected previously described links and pivots, which connect the rear wheels 102 and the axle 106, have been illustrated schematically by the broken lines 158. The axles 106 have been rotated in the directions shown by the arrows 154.

FIG. 27 shows the folded configuration of the tricycle 100 in which the rear wheels 102 are nearly in line with and nearly parallel to, the front wheel 14 thereby forming an extremely compact configuration.

FIG. 28–31 show an alternate embodiment of the invention 200 which incorporates a set of gears 202, 204, 206 which connect the front fork 208 of the tricycle 200 with the seat 210. The front fork 208 is rotationally mounted on the longitudinal frame member 212 via a shaft 214, which is mounted in a bearing 216.

The front fork 208 supports the front wheel 218 which is mounted on an axle 220 and the rear wheels 222 are mounted on the transverse frame member 224 via axle 226. The top 228 of the shaft 214 is connected to the gear 202. The gear 202 is in mesh with the idler gear 204 which is mounted on the longitudinal frame member 212 via a shaft 230 and a bearing 232. The idler gear 204 in turn is in mesh with the sector gear 206. The sector gear 206 is mounted on the longitudinal frame member 212 via a shaft 234 and a bearing 236. The sector gear 206 is connected to the seat 210 via a seat support bracket 240. The sector gear 206, the idler gear 204, and the gear 202 may be spur gears.

Figure 32:
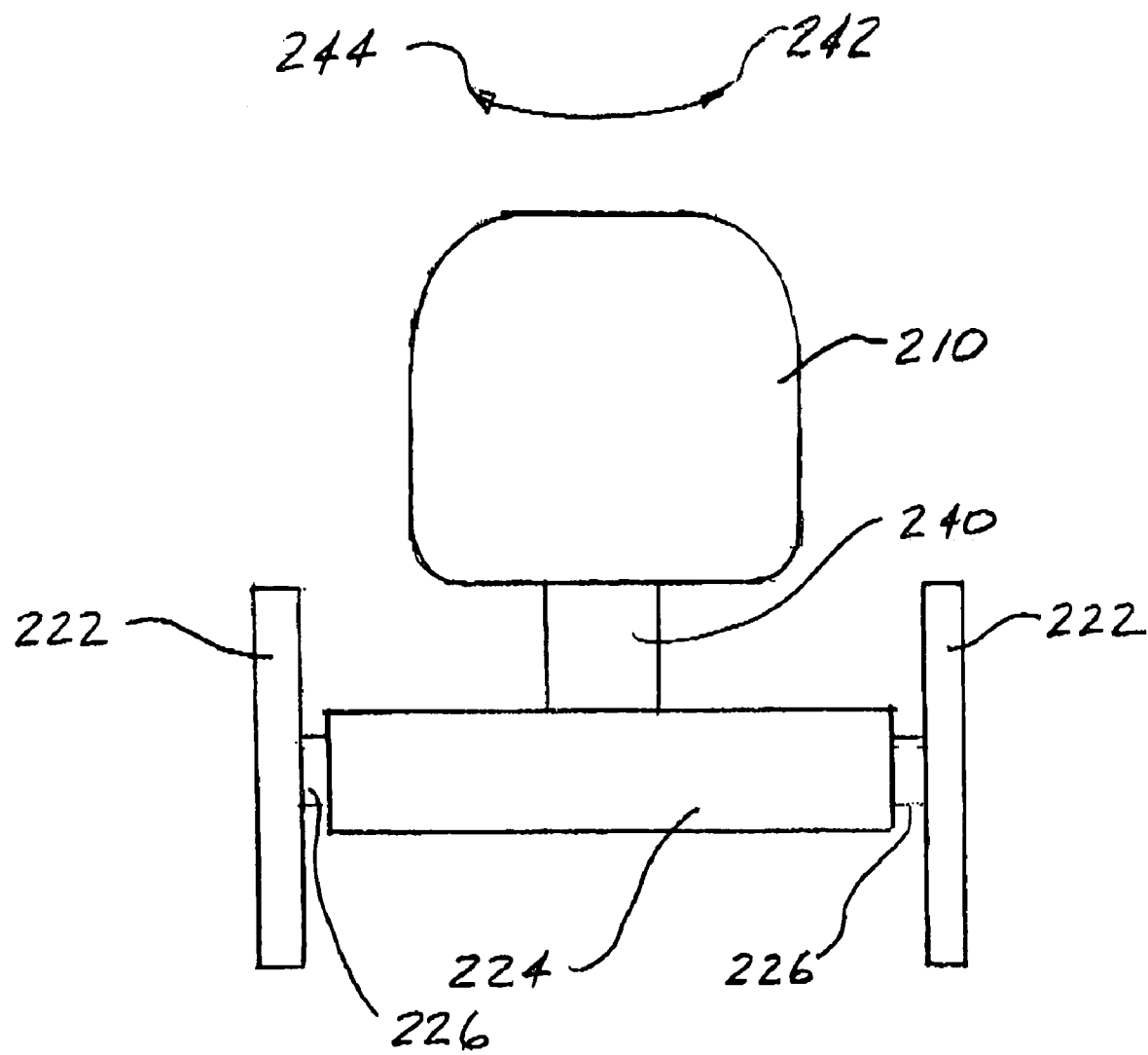
FIG. 32 is a rear elevation view taken along the line 32—32 of FIG. 28.

Motion of the rider's body causes rotation of the seat 210 as indicated by the arrows 242, 244 in FIG. 32 causes rotation of the gears 202, 204, 206 and consequent rotation of the front fork 208 and steering control of the tricycle 200. The use of the idler gear 204 enables the rider to steer towards the right by turning to the right and alternatively steer towards the left by turning towards the left.

Figure 33:
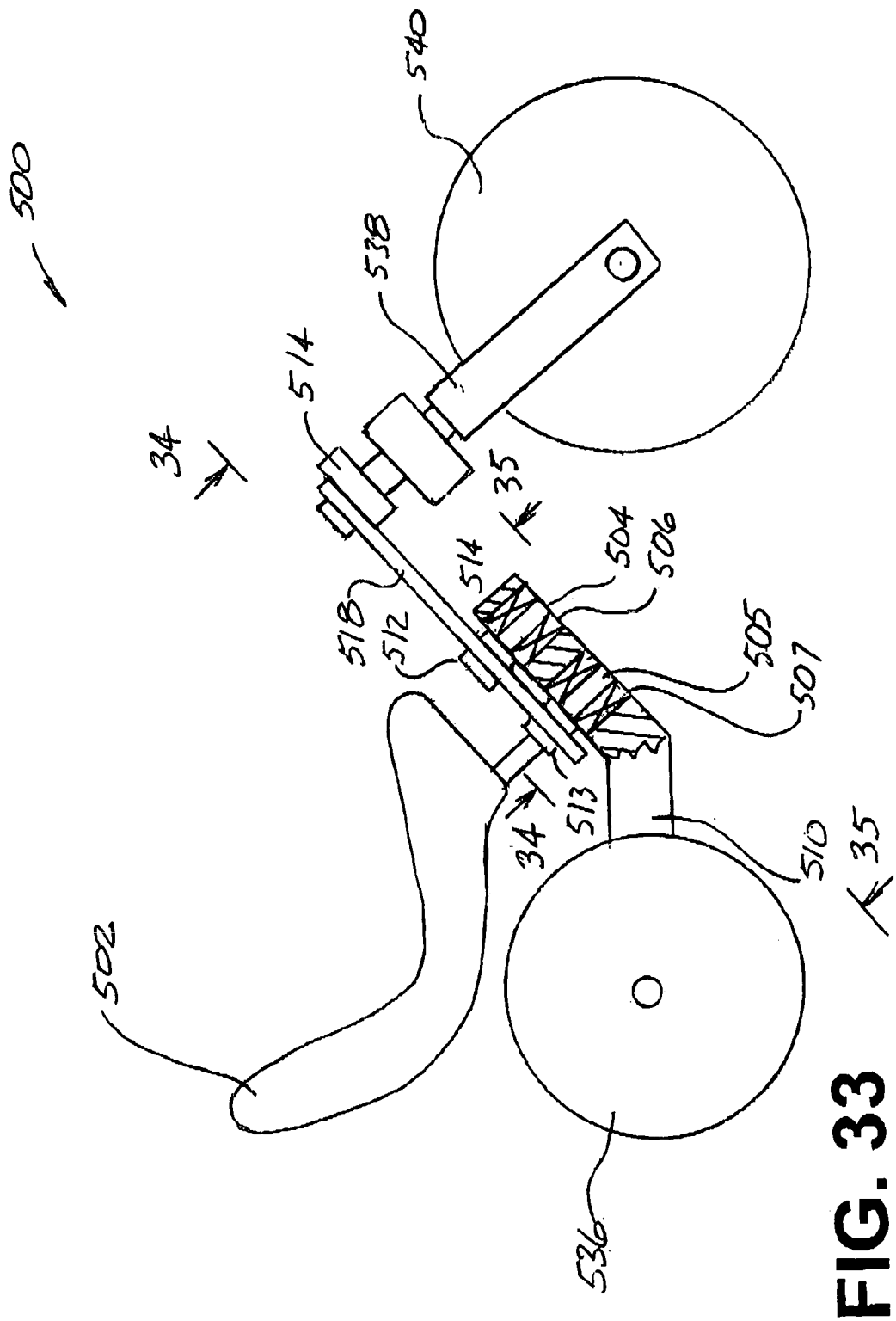
FIG. 33 is a schematic side elevation view of another alternative embodiment of the tricycle of FIG. 1 which incorporates a pair of links connecting the front fork and the seat.
Figure 34:
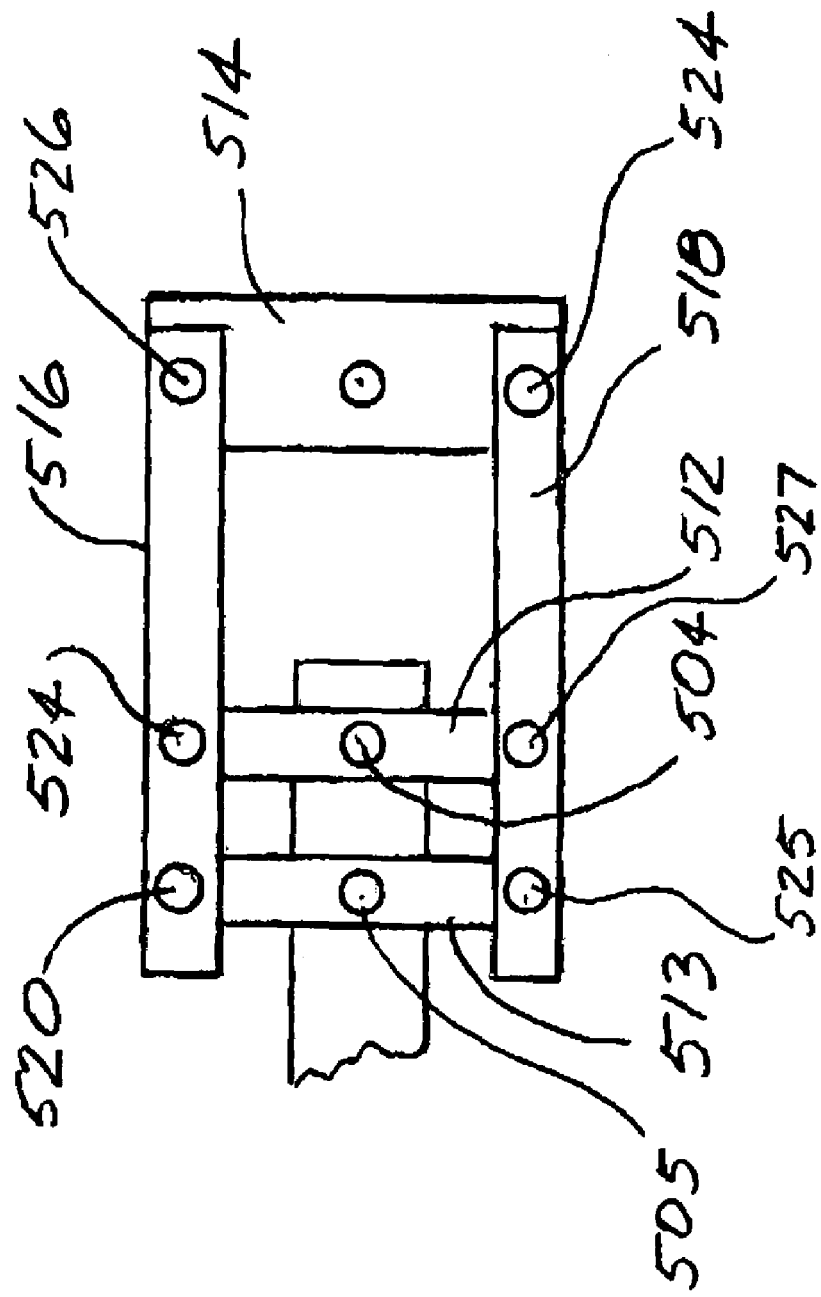
FIG. 34 is a fragmentary plan view taken along the line 34—34 of FIG. 33.
Figure 35:
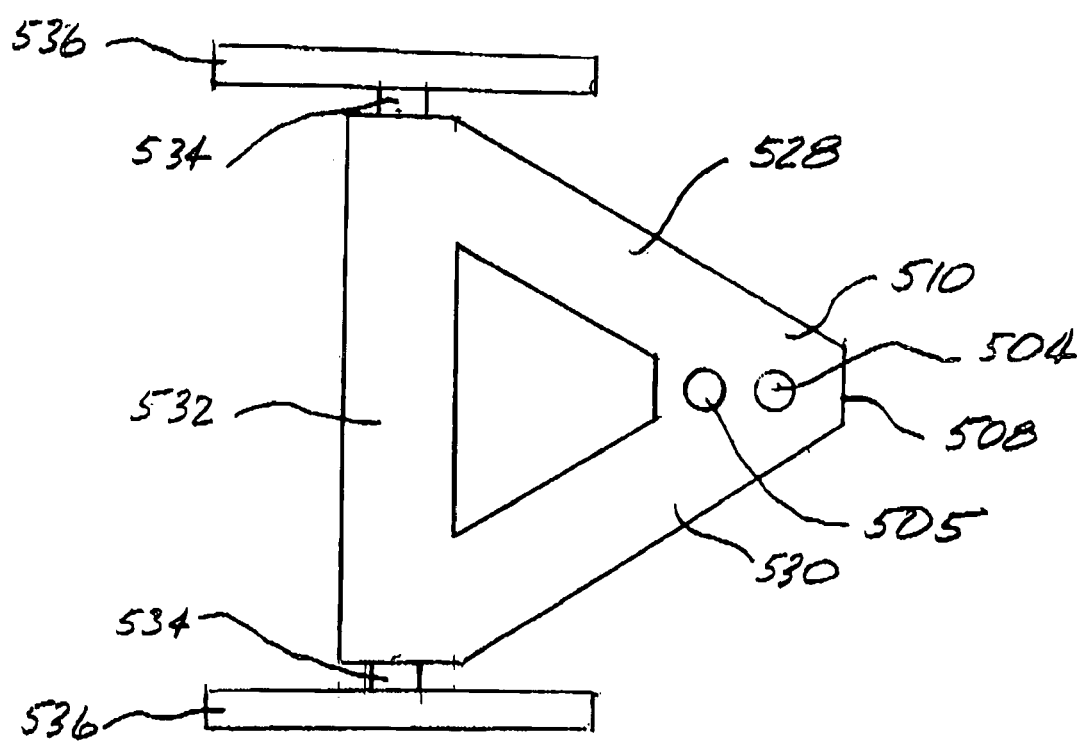
FIG. 35 is a fragmentary bottom plan view taken along the line 35—35 of FIG. 33.

FIG. 33 shows yet another alternative embodiment of the invention in which the seat 502 is mounted on support shafts 504, 505 which are supported in bearings 506, 507 which are located on the apex 508 of a triangular frame 510 as shown in FIG. 35.

Seat support member 513 is pivotally mounted on the support shaft 505 and is connected to a front fork member 514 by a pair of links 516, 518. The links 516, 518 are connected to the seat support members 512, 513 and the front fork member 514 by pivots 520, 522, 524, 525, 526, and 527.

The triangular frame 510 includes three frame members 528, 530, 532 which support the rear axle 534 and rear wheels 536 as is shown in FIG. 35.

Rotation or leaning of the rider's body to the right causes the tricycle 500 to steer to the right by turning the front fork 538 and the front wheel 540 to the right. Similarly, rotation or leaning of the rider's body to the left causes the tricycle 500 to steer to the left.

Figure 36:
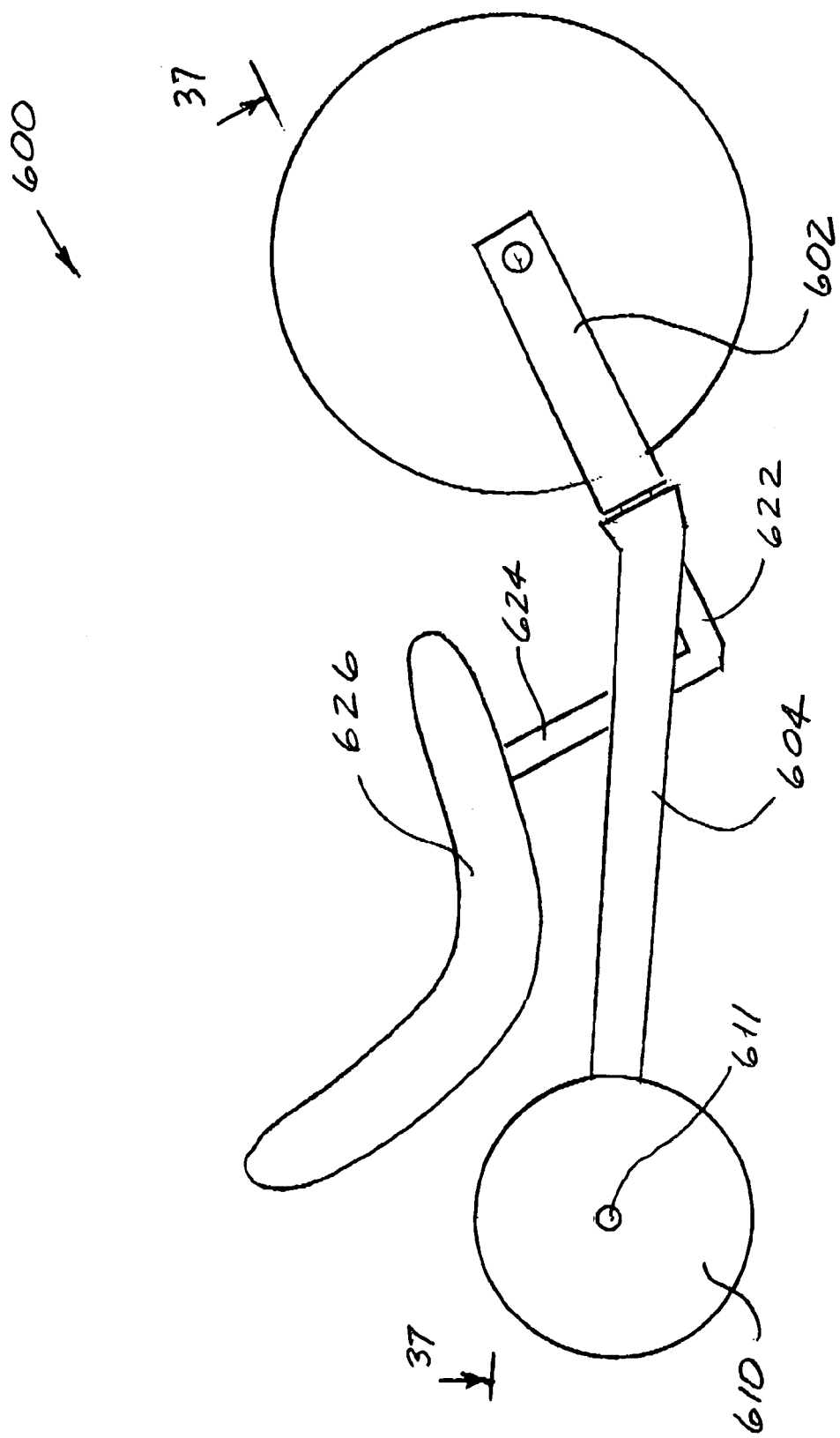
FIG. 36 is a schematic side elevation view of another alternative embodiment of the tricycle of FIG. 1 which incorporates a downwardly directly front fork.
Figure 37:
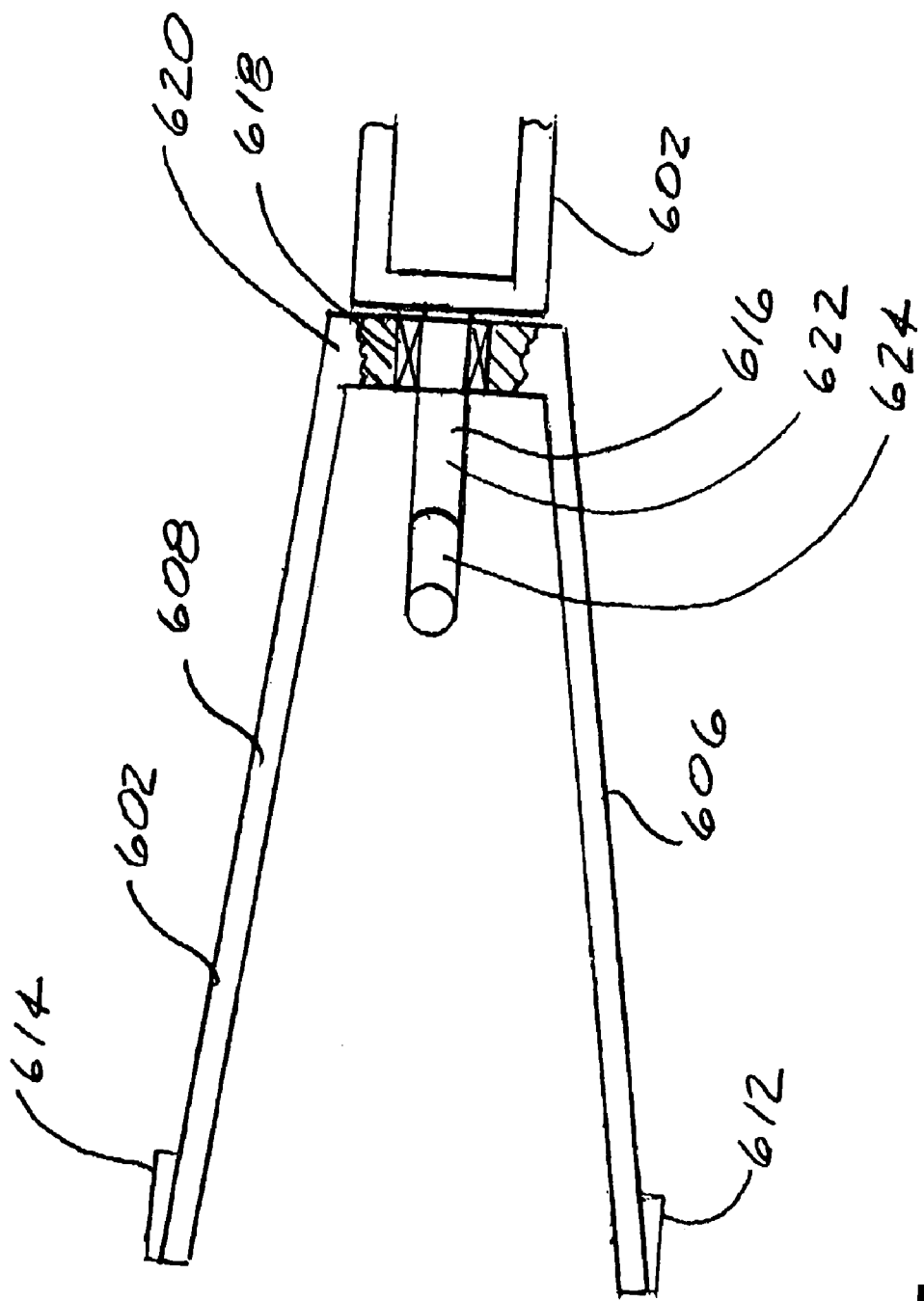
FIG. 37 is a fragmentary elevation view partially in section taken along the line 37—37 of FIG. 36 showing the frame and the front fork.

FIGS. 36 and 37 show another embodiment of the invention 600 which incorporates a downwardly directed front fork 602 and a frame assembly 604. The frame members 606, 608 of frame assembly 602, when viewed as in FIG. 37, have the general configuration of a capital letter V. The rear wheels, one of which is designated by the reference numeral 610 in FIG. 36, are mounted in bearings, one of which is designated by reference numerals 611, which are mounted in bearing blocks 612, 614. The front fork 602 is connected to a seat support shaft 616 which is pivotally mounted in a bearing 618 which is supported in a frame block 620. The seat support shaft 616 has a first portion 622 which is in general alignment with the downwardly directed front fork 602 and a second portion 624 which projects in an upward direction as is shown in FIG. 36 to support the seat 626.

Swiveling of the seat to the left and turning or leaning of the rider's body to the right turns the tricycle 600 to the right. Similarly, swiveling of the seat to the right and turning or leaning to the left turns the tricycle 600 to the left.

Figure 38:
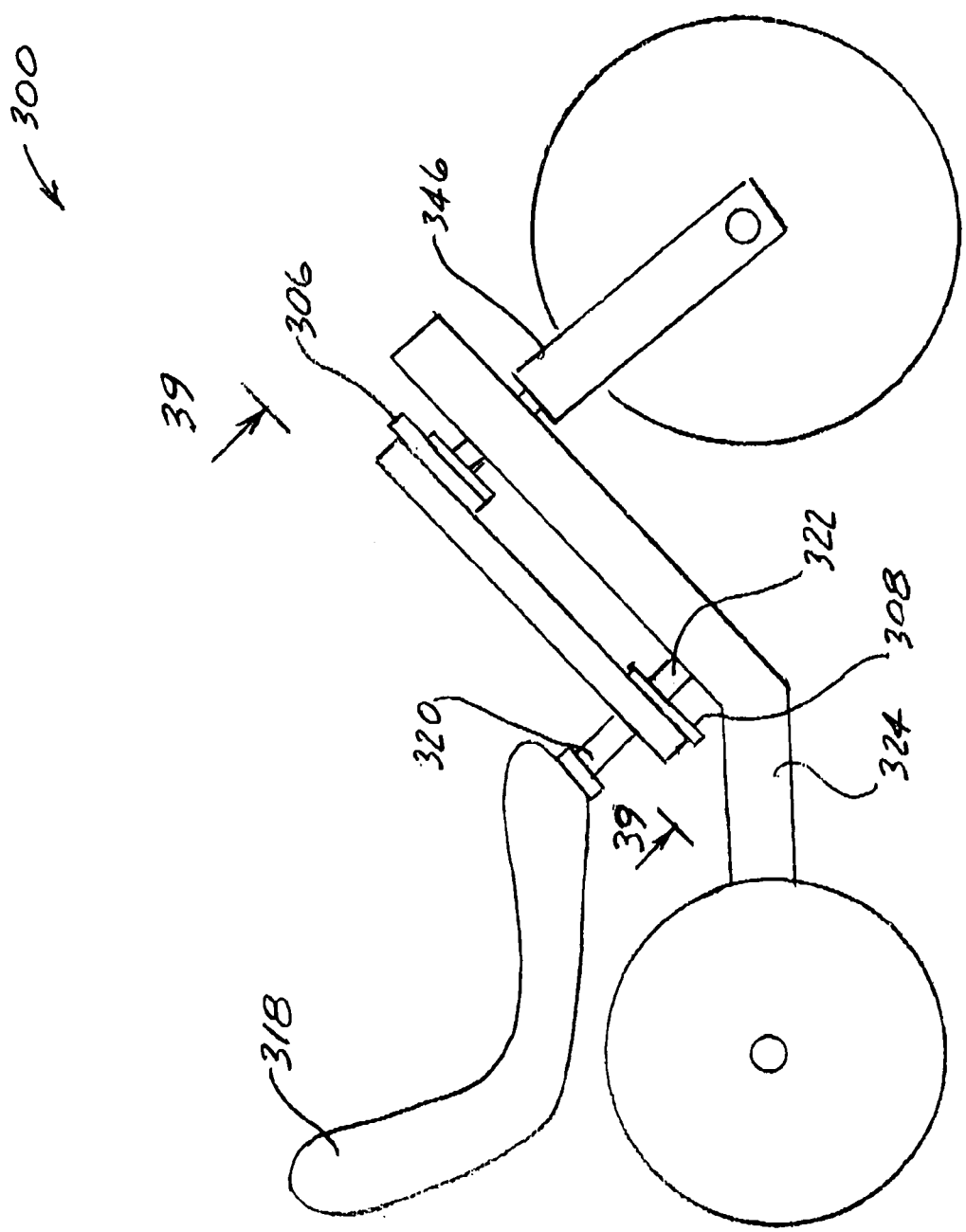
FIG. 38 is a schematic side elevation view of another alternative embodiment the tricycle of FIG. 1.
Figure 39:
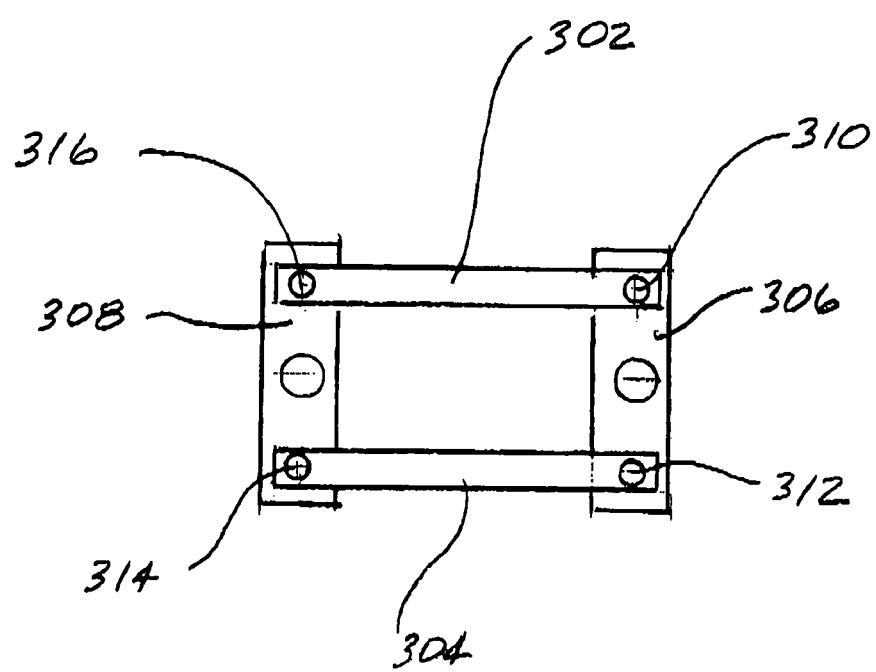
FIG. 39 is a fragmentary plan view taken along the line 39—39 of FIG. 38.

FIG. 38 shows another alternative embodiment of the invention 300 which incorporates a pair of links 302, 304 which connect a front fork member 306 and a seat member 308. The links 302, 304 are connected to the front fork member 306 and the seat member 308 by pivots 310, 312, 314, 316.

The seat 318 is supported on the upper end 320 of a shaft 322 which is pivotally mounted on the longitudinal frame member 324. The seat member 308 is connected to the shaft 322 and rotation of the shaft 322 rotates seat member 308.

Motion or rotation of the rider's body while seated in the seat 318 in the directions shown by the arrows 242, 244 in FIG. 32 causes rotation of the front fork member 306 in the directions shown by the arrows 242, 244 and rotation of the front fork 346. The motion of the rider's body thus enables the rider to steer the tricycle 300. Rotation of the rider's body to the right causes the tricycle 300 to turn to the right and similarly rotation of the rider's body to the left causes the tricycle 300 to turn to the left.

Figure 28:
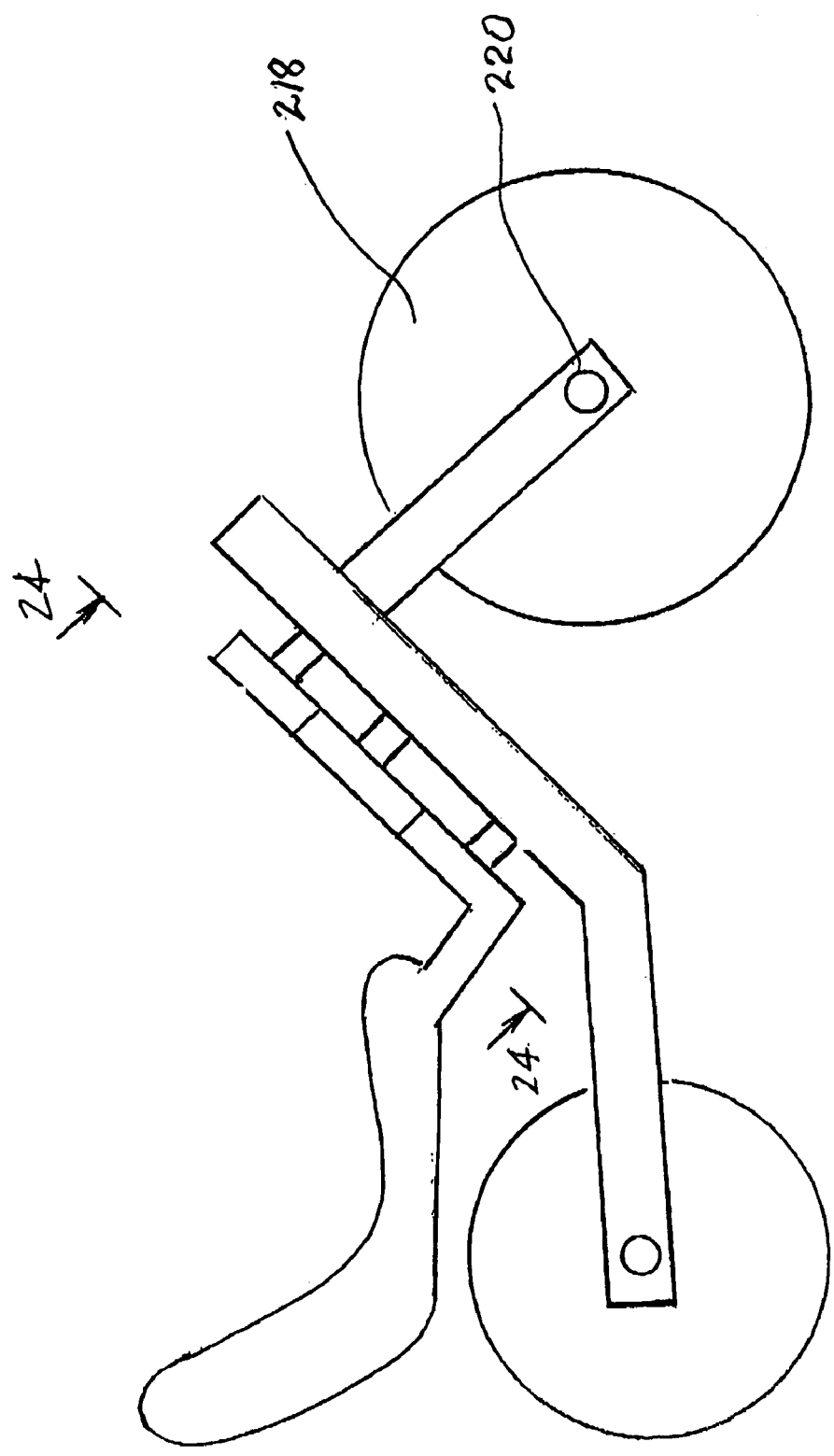
FIG. 28 is a schematic side elevation view of an alternative embodiment of the tricycle of FIG. 1 which incorporates a set of gears to connect the front fork and the seat.
Figure 30:
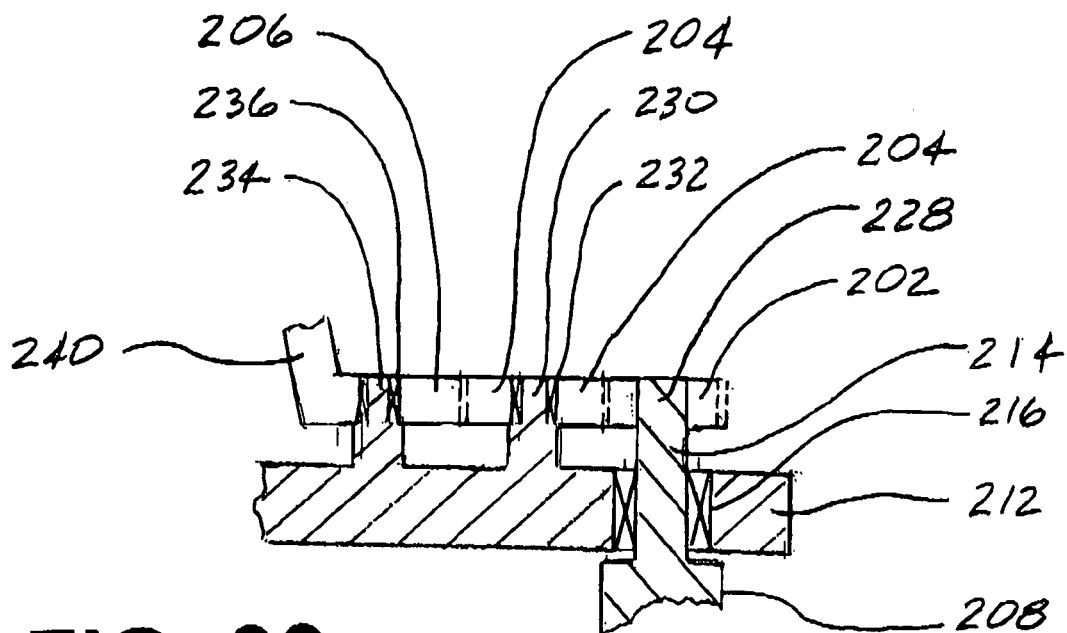
FIG. 30 is a fragmentary cross-sectional view taken along the line 30—30 of FIG. 29.
Figure 29:
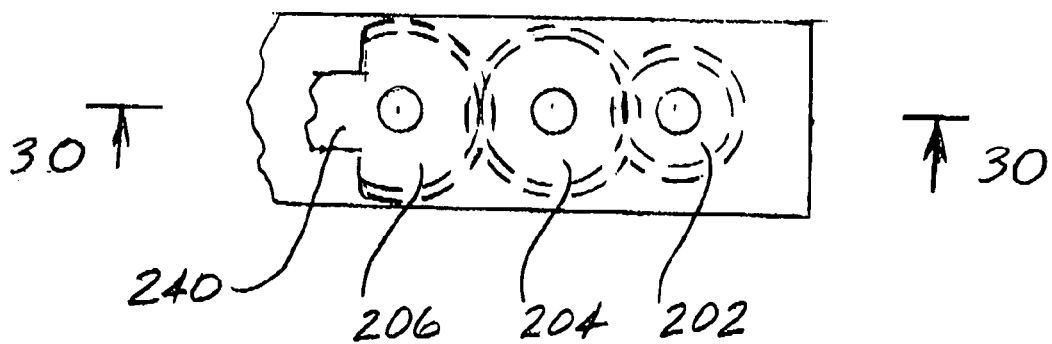
FIG. 29 is a fragmentary plan view taken along the line 29—29 of FIG. 28.
Figure 31:
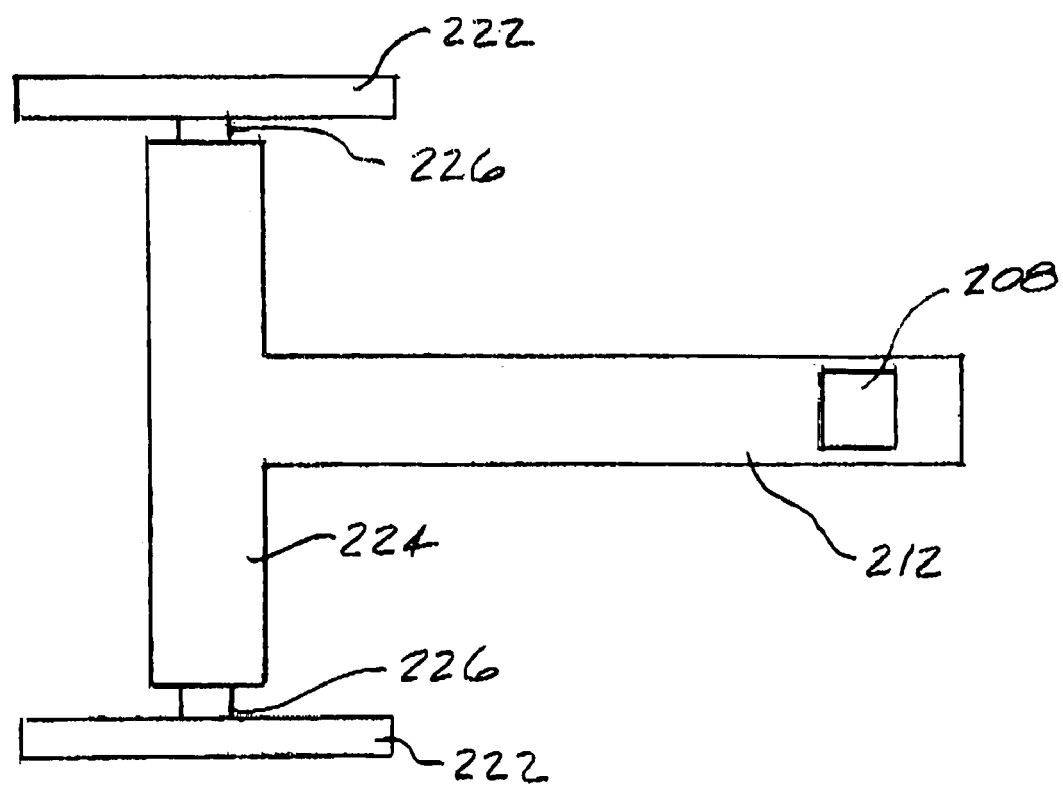
FIG. 31 is a fragmentary bottom plan view the frame of the embodiment shown in FIG. 28 taken along the line 31—31 of FIG. 28.
Figure 40:
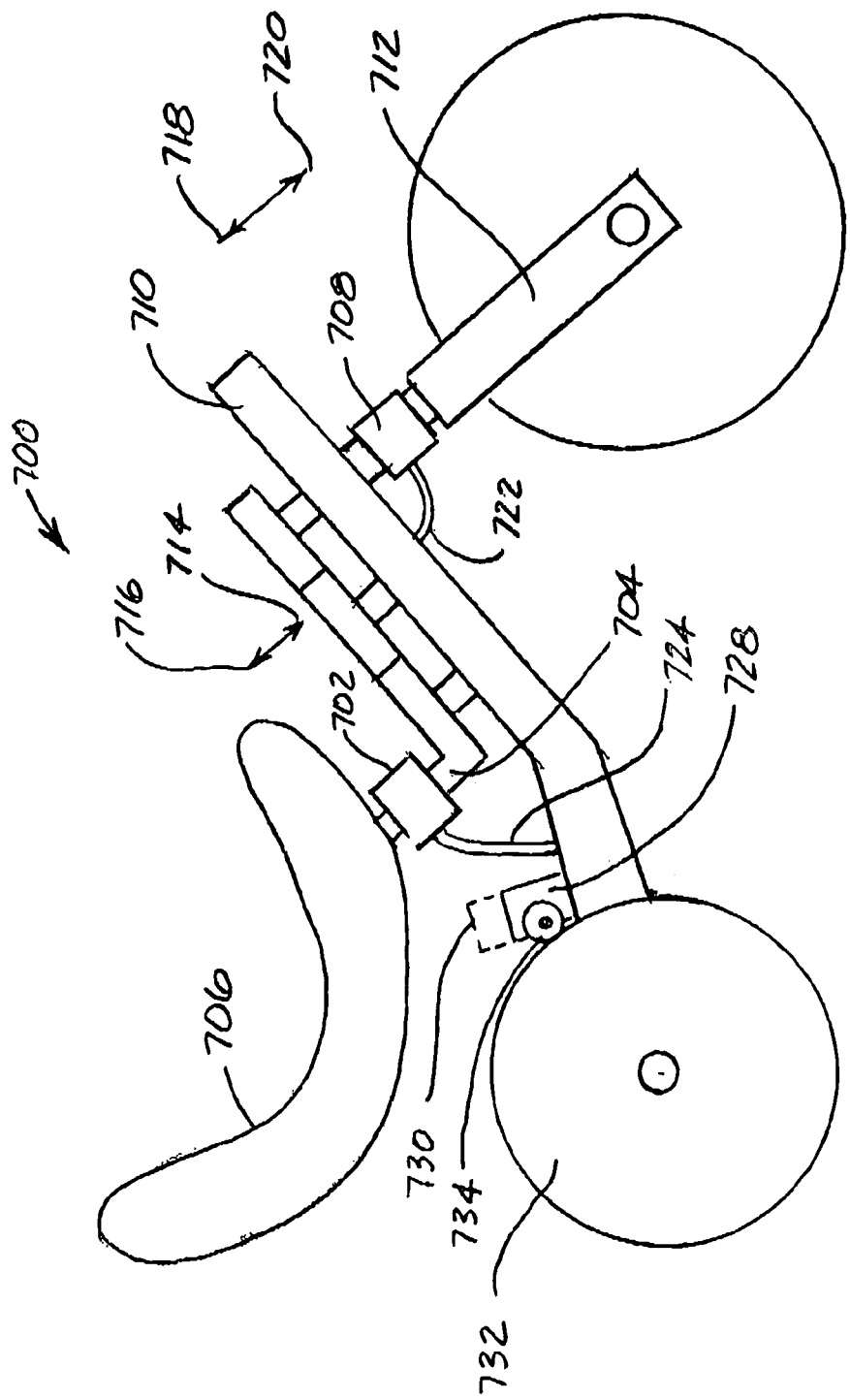
FIG. 40 is a schematic side elevation view of yet another alternative embodiment of the tricycle of FIG. 1 which incorporates gas springs.

FIG. 40 shows yet another embodiment 700 of the invention which is generally similar to the embodiment shown in FIG. 28 with the exception that a first gas spring or air spring 702 is mounted on the seat stern 704 supporting the seat 706 and a second gas spring 708 is mounted on the frame 710 supporting the front fork 712. The air springs 702, 708 facilitate the adjustment of the position of the seat 706 and the position of the front fork 712 along the directions shown by the arrows 714, 716, 718, 720 in FIG. 40. The air springs 702, 708 also facilitate the adjustment of the spring rate thereby providing capability for adjustment of the stiffness or comfort level of the ride provided by the tricycle 700.

The gas springs 702, 708 may be provided as sealed units or, alternatively, they may be provided with connecting tube 722, 724 as shown in FIG. 40. The tubes 722, 724 are connected to the frame 710, which is a sealed hollow tubular unit. The frame 710 functions as an air frame or reservoir and is pressurized by a small air compressor 708, which is powered by an electric battery which is shown in broken lines 730 or, alternatively, the air compressor 728 may be powered by rotation of one of the wheels 732 of the tricycle 700 via a drive wheel 734 or similar driving connection.

Alternatively, the gas springs may be connected directly to the compressor. The use of gas springs 702, 708 has been shown by way of illustration in connection with the embodiment of the invention shown in FIG. 28. It is clear that the gas springs 702, 708 and the associated components connected to the gas springs 702, 708 may be used with each of the various embodiments of the present invention.

The foregoing specific embodiments of the present invention as set forth in the specification herein are for illustrative purposes only. Various deviations and modifications may be made within the spirit and scope of this invention without departing from the main theme thereof.

What is claimed is:

1. A three-wheel vehicle comprising:
   a) a front wheel assembly communicating with a pedal assembly, and a seat arranged rearward of said front wheel assembly, said front wheel assembly having a single front wheel disposed thereon to permit said front wheel to turn so as to steer the three-wheel vehicle, said front wheel having a horizontal axle centrally disposed therein;
   b) a rear main frame, said rear main frame having two rear wheels disposed thereon, wherein said rear wheels are disposed on opposite ends of an axle member and a tongue member extends forwardly midway from said axle, said tongue having a forward end thereon to permit attachment of the rear main frame to the three-wheel vehicle;
   c) a means for connecting said forward end of said tongue member to said front wheel assembly whereby the front wheel assembly is rotatably disposed on the tongue of the rear main frame;
   d) a pair of handles disposed on said rear main frame to permit a user to grasp thereto with their hands;
   e) a pair of footrests disposed on said rear main frame to permit a user to place their feet thereon.

2. The apparatus of claim 1 further comprising means for adjusting said pedal assembly and said front wheel assembly in a longitudinal direction with respect to said seat to permit a user to vary the distance from the seat to the pedal assembly and the front wheel assembly.

3. The apparatus of claim 2 wherein said means for adjusting said front wheel assembly comprises:
   a) a steering pivot column, said column being slightly inclined toward the rear of the vehicle, said column having a first upper end and a second lower end, wherein a pair of radially opposed arms extend away from said second lower end thereby forming a left and a right arm;
   b) a primary extension clamp extending downwardly from each of said radially opposed arms, said primary extension clamp having a first upper end and a second lower end, said first upper end of said primary extension clamp being fixedly pivotally connected to said radially opposed arm to permit the primary extension clamp to pivot in the vertical plane about the radially opposed arms and thereby move the front wheel in a longitudinal direction;
   c) a front wheel column extending downwardly from each of said primary extension clamps, said front wheel column having a first upper end and a second lower end, said first upper end of said front wheel column being fixedly pivotally connected to said second lower end of said primary extension clamp to permit the front wheel column to pivot in the vertical plane about the lower end of the primary extension clamps and thereby move the front wheel in a longitudinal direction; and
   d) a front wheel arm extending forwardly from each of said front wheel columns, said front wheel arm having a first end and a second end, said first end of said front wheel arm being fixedly slidably disposed onto said front wheel column and said second end of said front wheel arm to be fixedly disposed onto said axle of said front wheel to thereby allow the front wheel to be moved up or down with respect to the front wheel column.

4. The apparatus of claim 2 wherein said means for adjusting said pedal assembly comprises:
   a) a pedal extension clamp extending upwardly from each of said second lower ends of primary extension clamps, said pedal extension clamp having a first lower end and a second upper end, said first lower end being fixedly pivotally connected to said second lower end of said primary extension clamp and said first upper end of said front wheel column to permit the pedal extension clamp to pivot in the vertical place about the lower end of the primary extension clamp and thereby move the pedal assembly in a longitudinal direction;
   b) a pedal column extending upwardly from each of said pedal extension clamps, said pedal column having a first lower end and a second upper end, said first lower end being fixedly pivotally connected to said second upper end of said pedal extension clamp to permit the pedal column to pivot in the vertical plane about the second upper end of the pedal extension clamp and thereby move the pedal assembly in a longitudinal direction; and
   c) a pedal U-fork extending upwardly from each of said pedal columns, said pedal U-fork having a first lower end and a second upper end, said first lower end fixedly connected to each of said second upper ends of the pedal column, said second upper end having a single member fixedly connected to said pedal assembly.

5. The apparatus of claim 4 wherein said means for connecting said forward end of said tongue member to said front wheel assembly comprises:
   a) wherein said forward end of said tongue member has a steering pivot slot therein; and
   b) wherein said steering pivot column is rotatably disposed in said steering pivot slot to permit connection of the rear main frame to the front wheel assembly.

6. The apparatus of claim 5 wherein said seat further comprises:
   a) a seat frame clamp, said seat frame clamp being fixedly connected to said steering pivot column;
   b) a generally horizontal seat frame having a bottom seat disposed thereon for receiving a user'd buttocks, said seat frame having a first front end and a second rear end, said first front end of said seat frame being fixedly pivotally connected to said seat frame clamp to permit the rear end of the seat frame to pivot up and down;
   c) a generally vertical back seat frame having a back seat disposed thereon to receive a user'd back, said back seat frame having a first lower end and a second upper end; and
   d) a pivoting joint pivotally connecting said second rear end of said seat frame and said first lower end of said back seat frame to permit the back seat frame to pivot with respect to the seat frame.

7. The apparatus of claim 6 wherein there are a pair of pivoting joints connecting said seat frame to said back seat frame.

8. The apparatus of claim 7 wherein said chain drive further comprises:
   a) at least one sprocket disposed on said axle of said front wheel for cooperation with said pedal assembly wherein a chain drivingly connects said sprocket and said pedal assembly; and
   b) a chain support arm having a chain guard and a pair of roller arms, said chain guard disposed adjacent to said roller arms, further a chain roller disposed on compressor means and said first and said second gas spring means to pressurize said first and said second gas spring means.

9. A three-wheel comprising:
   a) a front wheel assembly communicating with a pedal assembly, and a seat arranged rearward of said front wheel assembly, said front wheel assembly having a single front wheel disposed thereon to permit said front wheel to turn so as to steer the three-wheel vehicle, said front wheel having a horizontal axle centrally disposed therein;
   b) a rear main frame, said rear main frame having two rear wheels disposed thereon, wherein said rear wheels are disposed on opposite ends of an axle member and a tongue member extends forwardly midway from said axle, said tongue having a forward end thereon to permit attachment of the rear main frame to the three-wheel vehicle;
   c) a means for connecting said forward end of said tongue member to said front wheel assembly whereby the front wheel assembly is rotatably disposed on the tongue of the rear main frame;
   d) a means for adjusting said pedal assembly and said front wheel assembly in a longitudinal direction with respect to said seat to permit a user to vary the distance from the seat to the pedal assembly and the front wheel assembly and wherein said means for adjusting said front wheel assembly comprising:
      (i) a steering pivot column, said column being slightly inclined toward the rear of the vehicle, said column having a first upper end and a second lower end, wherein a pair of radially opposed arms extend away from said second lower end thereby forming a left and a right arm;
      (ii) a primary extension clamp extending downwardly from each of said radially opposed arms, said primary extension clamp having a first upper end and a second lower end, said first upper end of said primary extension clamp being fixedly pivotally connected to said radially opposed arm to permit the primary extension clamp to pivot in the vertical plane about the radially opposed arms and thereby move the front wheel in a longitudinal direction;
      (iii) a front wheel column extending downwardly from each of said primary extension clamps, said front wheel column having a first upper end and a second lower end, said first upper end of said front wheel column being fixedly pivotally connected to said second lower end of said primary extension clamp to permit the front wheel column to pivot in the vertical plane about the lower end of the primary extension clamps and thereby move the front wheel in a longitudinal direction; and
      (iv) a front wheel arm extending forwardly from each of said front wheel columns, said front wheel arm having a first end and a second end, said first end of said front wheel arm being fixedly slidably disposed onto said front wheel column and said second end of said front wheel arm to be fixedly disposed onto said axle of said front wheel to thereby allow the front wheel to be moved up or down with respect to the front wheel column.

10. A three-wheel vehicle comprising:
   a) a front wheel assembly communicating with a pedal assembly, and a seat arranged rearward of said front wheel assembly, said front wheel assembly having a single front wheel disposed thereon to permit said front wheel to turn so as to steer the three-wheel vehicle, said front wheel having a horizontal axle centrally disposed therein;

b) a rear main frame, said rear main frame having two rear wheels disposed thereon, wherein said rear wheels are disposed on opposite ends of an axle member and a tongue member extends forwardly midway from said axle, said tongue having a forward end thereon to permit attachment of the rear main frame to the three-wheel vehicle;

c) a means for connecting said forward end of said tongue member to said front wheel assembly whereby the front wheel assembly is rotatably disposed on the tongue of the rear main frame;

d) a means for adjusting said pedal assembly and said front wheel assembly in a longitudinal direction with respect to said seat to permit a user to vary the distance from the seat of the pedal assembly and the front wheel assembly, and wherein said for adjusting said pedal assembly comprises:

(i) a pedal extension clamp extending upwardly from each of said second lower ends of primary extension clamps, said pedal extension clamp having a first lower end and a second upper end, said first lower end being fixedly pivotally connected to said second lower end of said primary extension clamp and said first upper end of said front wheel column to permit the pedal extension clamp to pivot in the vertical place about the lower end of the primary extension clamp and thereby move the pedal assembly in a longitudinal direction;

(ii) a pedal column extending upwardly from each of said pedal extension clamps, said pedal column having a first lower end and a second upper end, said first lower end being fixedly pivotally connected to said second upper end of said pedal extension clamp to permit the pedal column to pivot in the vertical plane about the second upper end of the pedal extension clamp and thereby move the pedal assembly in a longitudinal direction; and (iii) a pedal U-fork extending upwardly from each of said pedal columns, said pedal U-fork having a first lower end and a second upper end, said first lower end fixedly connected to each of said second upper ends of the pedal column, said second upper end having a single member fixedly connected to said pedal assembly.

* * * * *